United States Patent
Sun et al.

(10) Patent No.: US 11,979,458 B2
(45) Date of Patent: May 7, 2024

(54) SYSTEMS AND METHODS FOR PROVIDING DISCOVERY AND HIERARCHICAL MANAGEMENT OF DISTRIBUTED MULTI-ACCESS EDGE COMPUTING

(71) Applicant: Verizon Patent and Licensing Inc., Arlington, VA (US)

(72) Inventors: Dan Sun, Bridgewater, NJ (US); Weimin Liu, Chatham, NJ (US); Yuk Lun Li, Morganville, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/825,622

(22) Filed: Mar. 20, 2020

(65) Prior Publication Data

US 2021/0297485 A1 Sep. 23, 2021

(51) Int. Cl.
*H04L 67/1087* (2022.01)
*G06F 16/22* (2019.01)
*G06F 16/23* (2019.01)
*H04L 67/1061* (2022.01)
*H04L 67/1074* (2022.01)

(52) U.S. Cl.
CPC ...... *H04L 67/1089* (2013.01); *G06F 16/2228* (2019.01); *G06F 16/2379* (2019.01); *H04L 67/1063* (2013.01); *H04L 67/1076* (2013.01)

(58) Field of Classification Search
CPC ............. H04L 67/1089; H04L 67/1063; H04L 67/1076; G06F 16/2379; G06F 16/2228
See application file for complete search history.

(56) References Cited

U.S. PATENT DOCUMENTS

| | | | |
|---|---|---|---|
| 7,133,664 B2* | 11/2006 | Bahl | H04W 4/029 455/414.3 |
| 10,579,422 B2* | 3/2020 | Roth | G06F 9/46 |
| 10,628,180 B1* | 4/2020 | Swanger | G06F 9/451 |
| 10,715,387 B1* | 7/2020 | Tutuianu | H04L 41/5054 |
| 2015/0019737 A1* | 1/2015 | Kim | H04L 47/70 709/226 |
| 2015/0215394 A1* | 7/2015 | Nemoto | G06F 9/505 709/202 |
| 2016/0253351 A1* | 9/2016 | Hansen | G06F 11/1464 707/692 |
| 2017/0220389 A1* | 8/2017 | Michael | G06F 9/5027 |
| 2019/0098089 A1* | 3/2019 | Shim | H04L 67/565 |

(Continued)

*Primary Examiner* — William G Trost, IV
*Assistant Examiner* — Abdelbasst Talioua

(57) ABSTRACT

A device may store first data structures that include first data identifying computing resources provided at an edge of a network for a computing environment. The device may store second data structures that include second data identifying aggregations of portions of the first data, and may store a third data structure that includes third data identifying an aggregation of the second data. The device may receive, from a first client device, client data identifying an address and resources associated with the first client device, and may update a first data structure based on the client data. The device may update a second data structure based on updating the first data structure, and may update the third data structure based on updating the second data structure. The device may provide a notification indicating that the first client device has been added as a computing resource for the computing environment.

20 Claims, 20 Drawing Sheets

(56) References Cited

U.S. PATENT DOCUMENTS

| | | | |
|---|---|---|---|
| 2019/0294721 A1* | 9/2019 | Keifer | G06F 16/282 |
| 2020/0244297 A1* | 7/2020 | Zalewski | H04W 4/70 |
| 2021/0058247 A1* | 2/2021 | Bursell | H04L 9/0869 |
| 2021/0090548 A1* | 3/2021 | Debner | G10L 13/086 |
| 2021/0286697 A1* | 9/2021 | Yang | G06F 11/3452 |

* cited by examiner

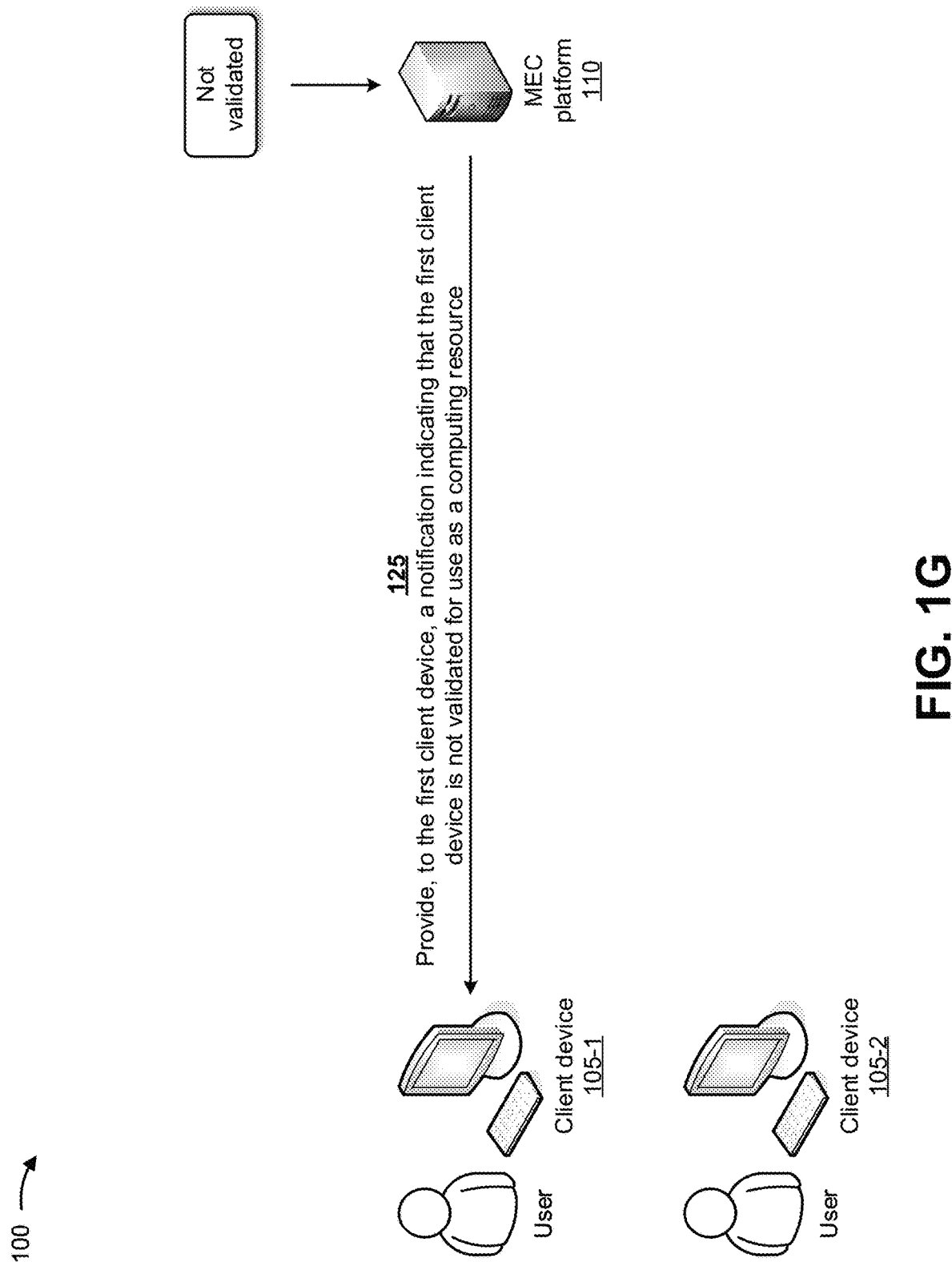

SYSTEMS AND METHODS FOR PROVIDING DISCOVERY AND HIERARCHICAL MANAGEMENT OF DISTRIBUTED MULTI-ACCESS EDGE COMPUTING

BACKGROUND

With multi-access edge computing (MEC), a computing environment may extend towards an edge of a network via transport access points (TAPs), service access points (SAPs), a radio access network (RAN) in a wireless network, a peering network, and/or the like in order to reduce round trip latency and scalability.

DETAILED DESCRIPTION OF PREFERRED EMBODIMENTS

Figure 1A:
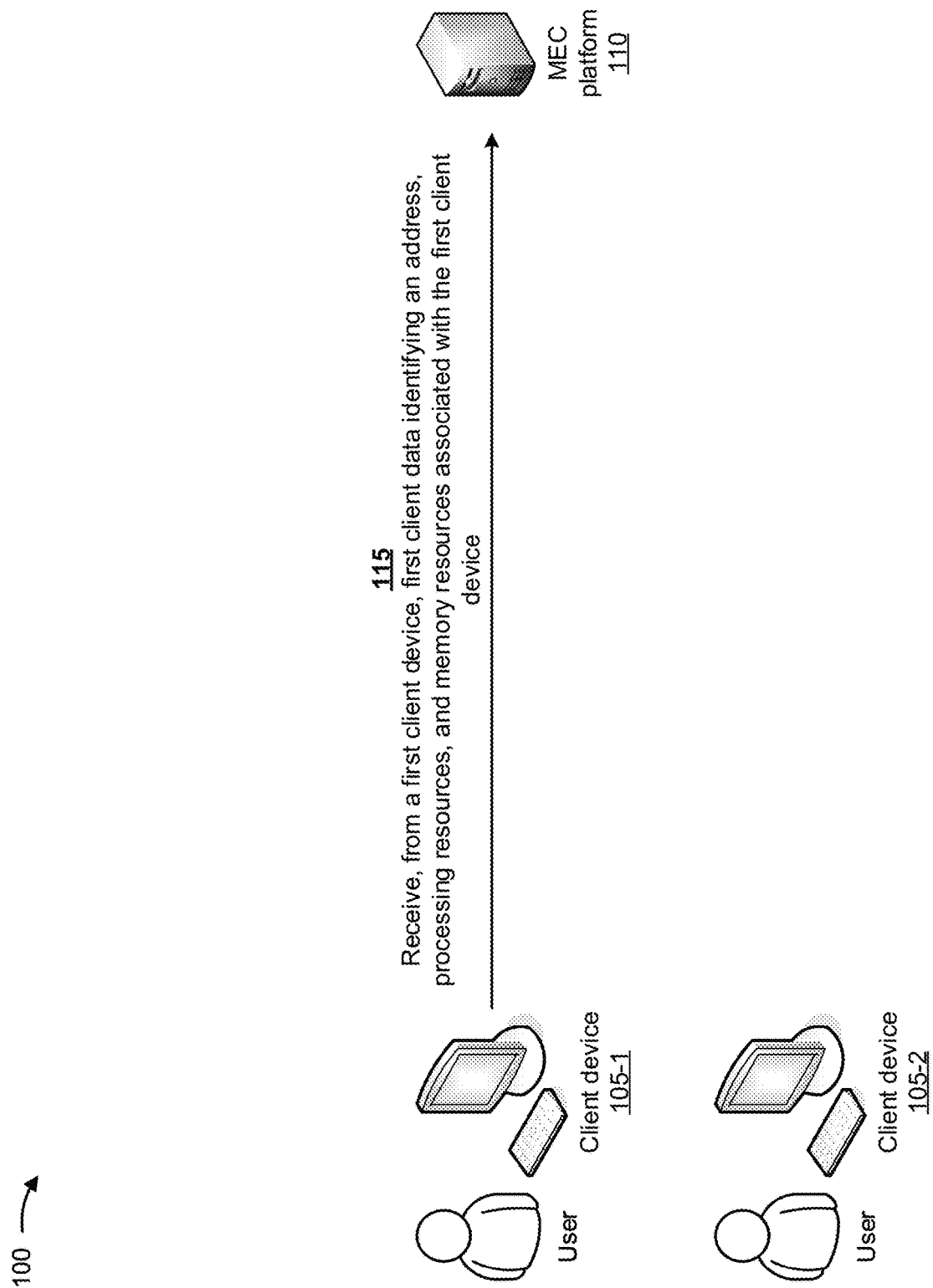
FIGS. 1A-1Q are diagrams of one or more example implementations described herein.

The following detailed description of example implementations refers to the accompanying drawings. The same reference numbers in different drawings may identify the same or similar elements.

MEC may enable a computing environment to utilize available computing resources at homes or businesses, when such computing resources are idle or underutilized, and owners of the computing resources are willing to share the computing resources. Current systems, which utilize centralized provision and management of MEC resources, are unwieldy since there are a few cloud computing providers and a large quantity of communications (e.g., which may overload a network) are generated when computing resources are provided at the edge of the network. Thus, current systems may not maximize computing resources (e.g., processing resources, memory resources, communication resources), networking resources, and/or the like associated with storing the large quantity of communications, processing the large quantity of communications, transmitting the large quantity of communications, receiving the large quantity of communications, and/or the like.

Some implementations described herein provide a MEC platform that provides discovery and hierarchical management of distributed multi-access edge computing for a computing environment. For example, the MEC platform may store a first plurality of data structures that include first data identifying a plurality of computing resources provided at an edge of a network for a computing environment, and may store a second plurality of data structures. Each of the second plurality of data structures may include second data identifying an aggregation of a portion of the first data identifying the plurality of computing resources. The MEC platform may store a third data structure that includes third data identifying an aggregation of the second data provided in each of the second plurality of data structures, and may receive, from a client device, client data identifying an address, processing resources, and memory resources associated with the client device. The MEC platform may update one of the first plurality of data structures based on the client data, and may update one of the second plurality of data structures based on updating the one of the first plurality of data structures. The MEC platform may update the third data structure based on updating the one of the second plurality of data structures, and may provide, to the client device, a notification indicating that the client device has been added as a computing resource for the cloud computing environment.

In this way, the MEC platform provides discovery and hierarchical management of distributed multi-access edge computing resources for a cloud computing environment. The MEC platform may expedite computing resource allocation and orchestration in a distributed manner, which results in lower latencies since the computing resources may be assigned as close as possible to a requesting client device. The MEC platform may provide improved scalability (e.g., compared to current systems) of distributed cluster masters to millions of distributed resources that support millions of client devices. Furthermore, the MEC platform may reduce user-plane traffic in a network backbone and may simplify integration of computing resources from heterogeneous networks. Thus, the MEC platform conserves computing resources (e.g., processing resources, memory resources, communication resources), networking resources, and/or the like that would otherwise be wasted in storing the large quantity of communications, processing the large quantity of communications, transmitting the large quantity of communications, receiving the large quantity of communications, and/or the like.

Figure 1B:
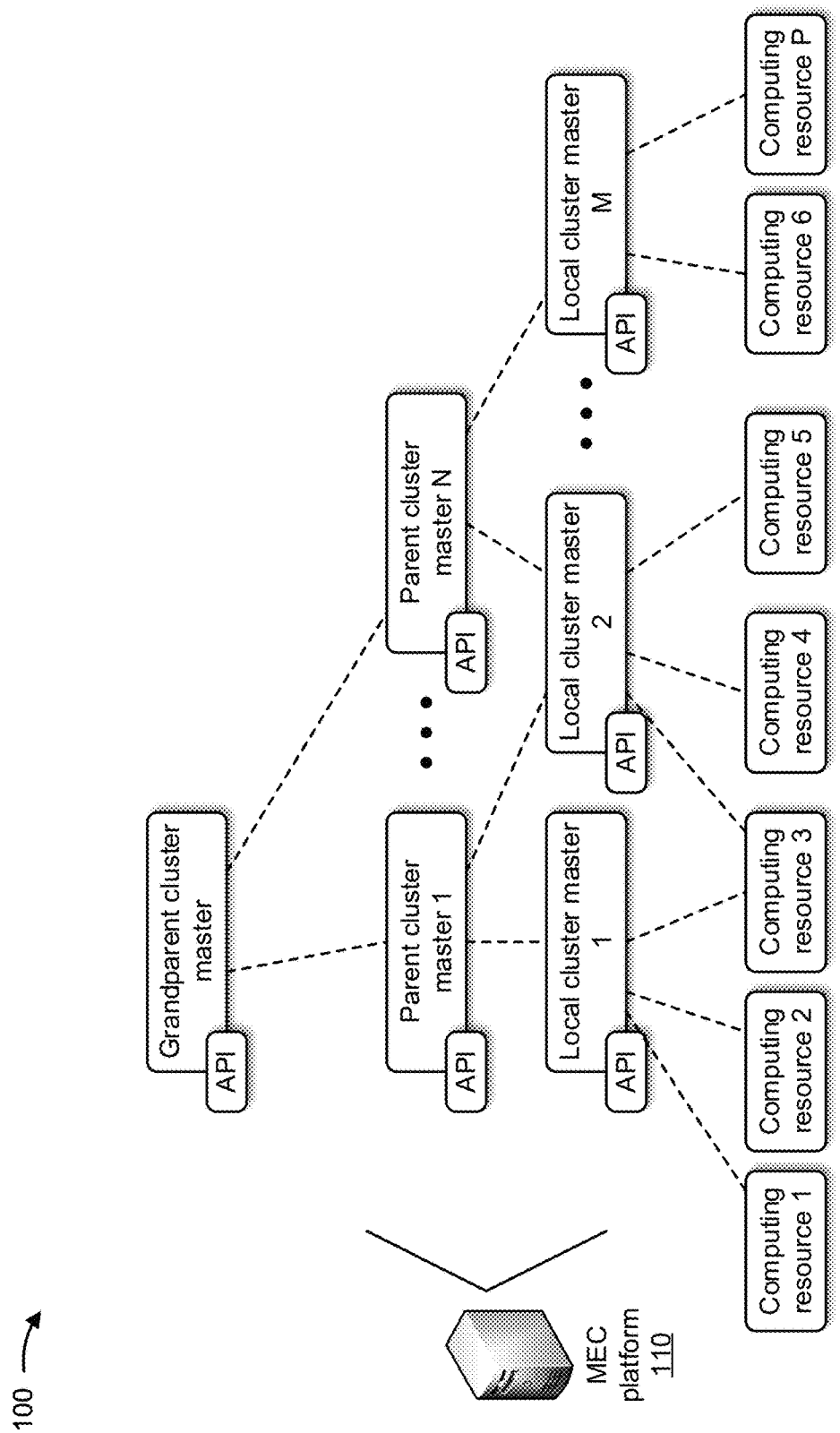
Figure 1C:
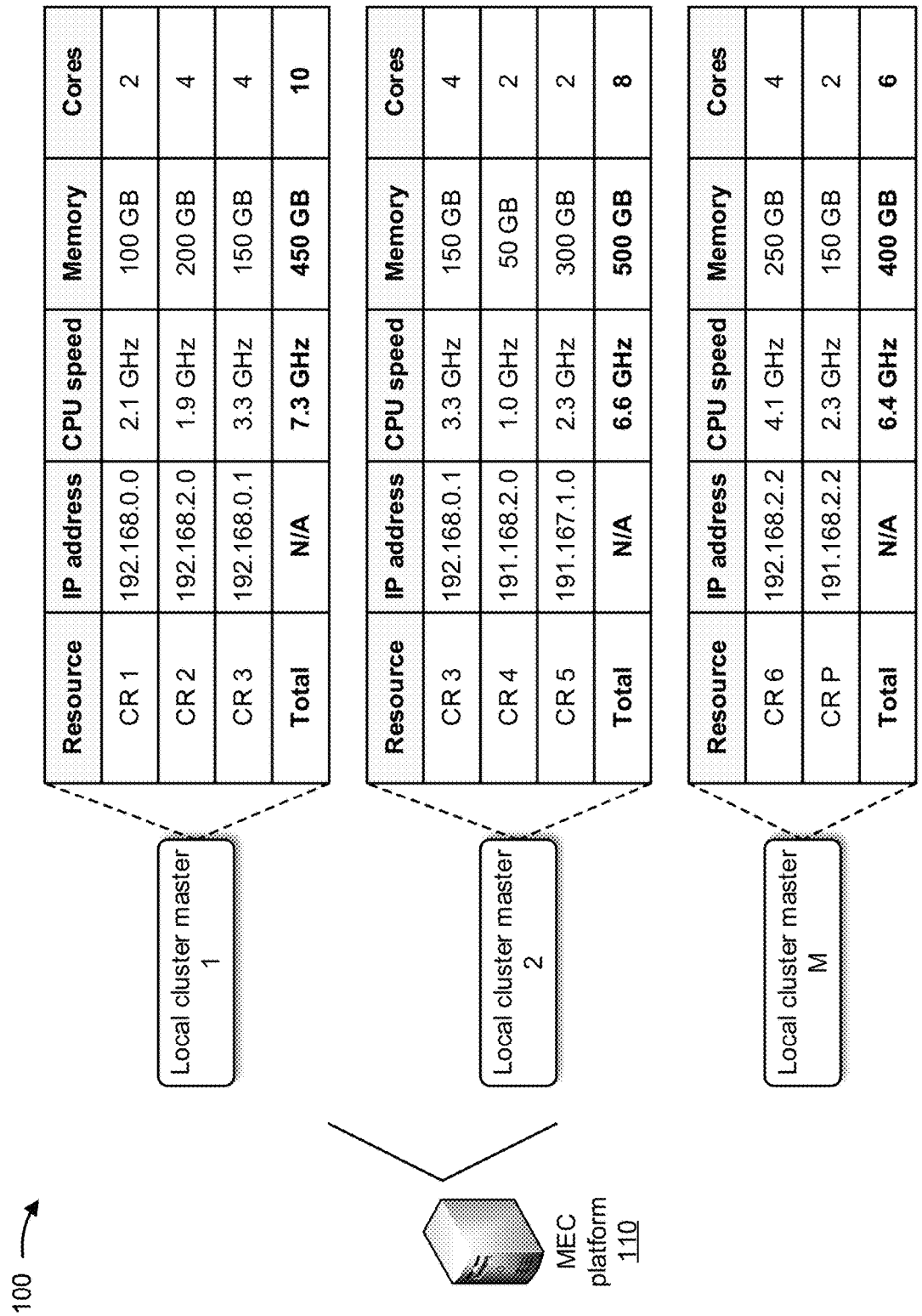
Figure 1D:
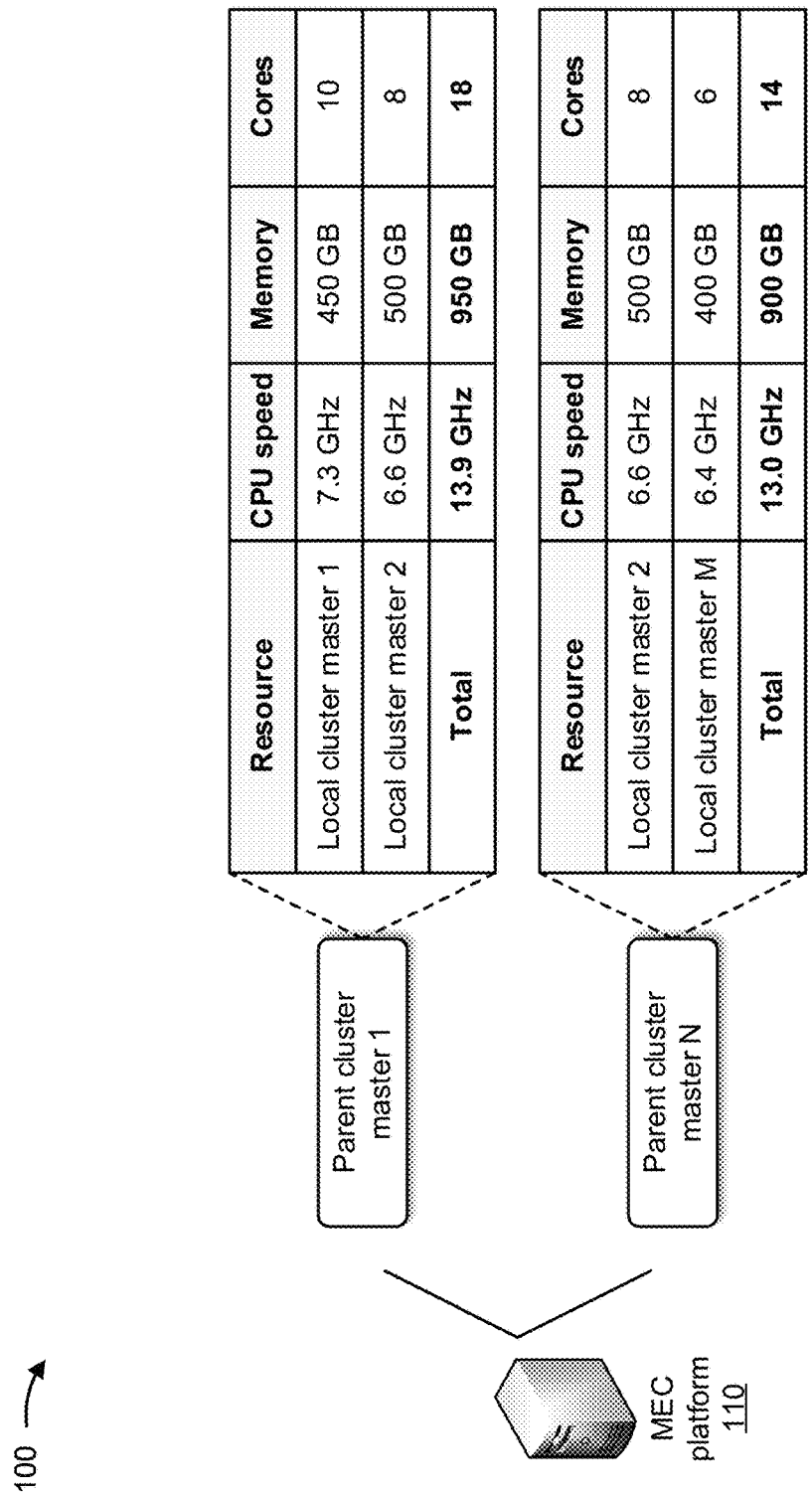
Figure 1E:
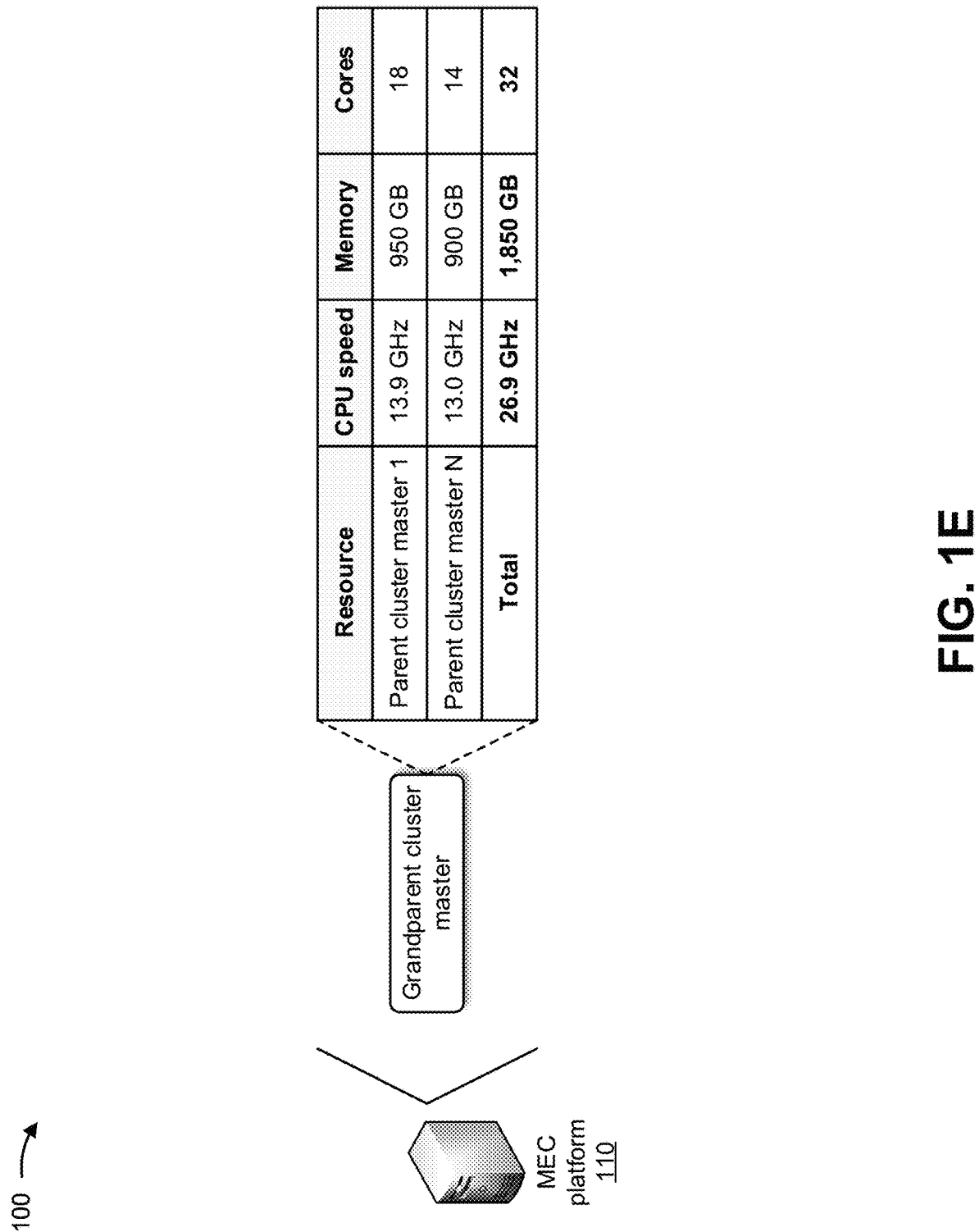
Figure 1F:
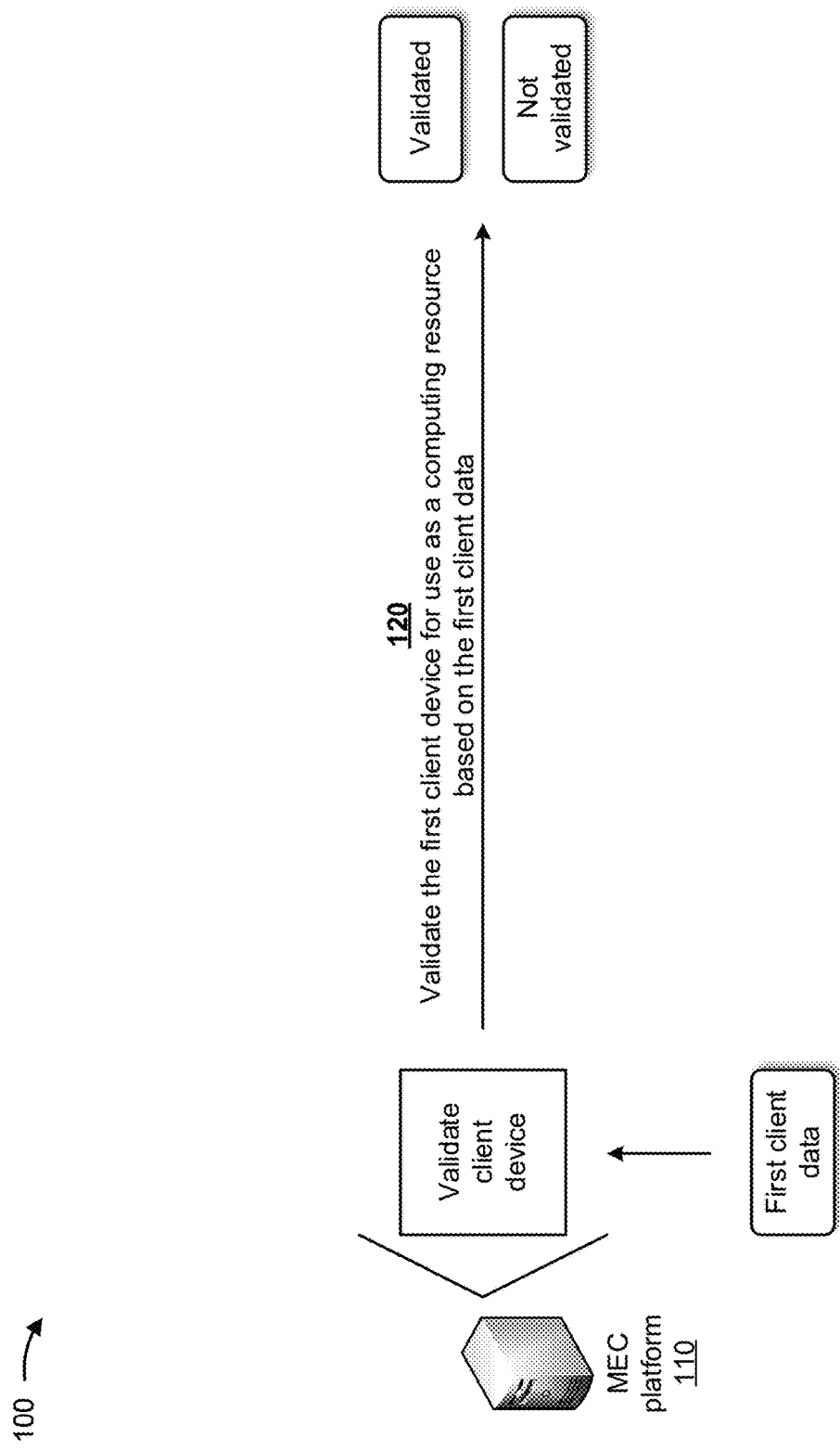
Figure 1H:
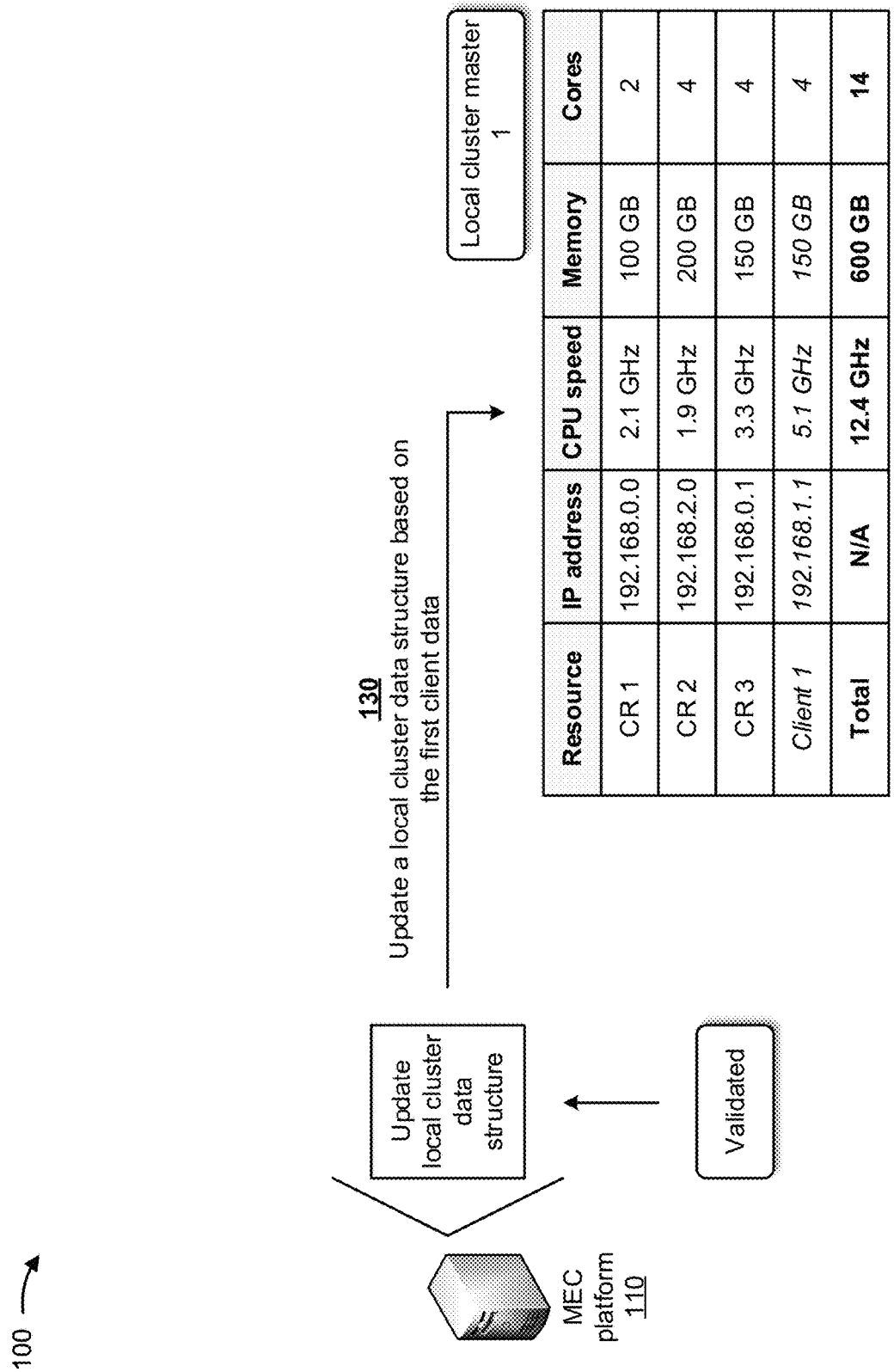
Figure 1I:
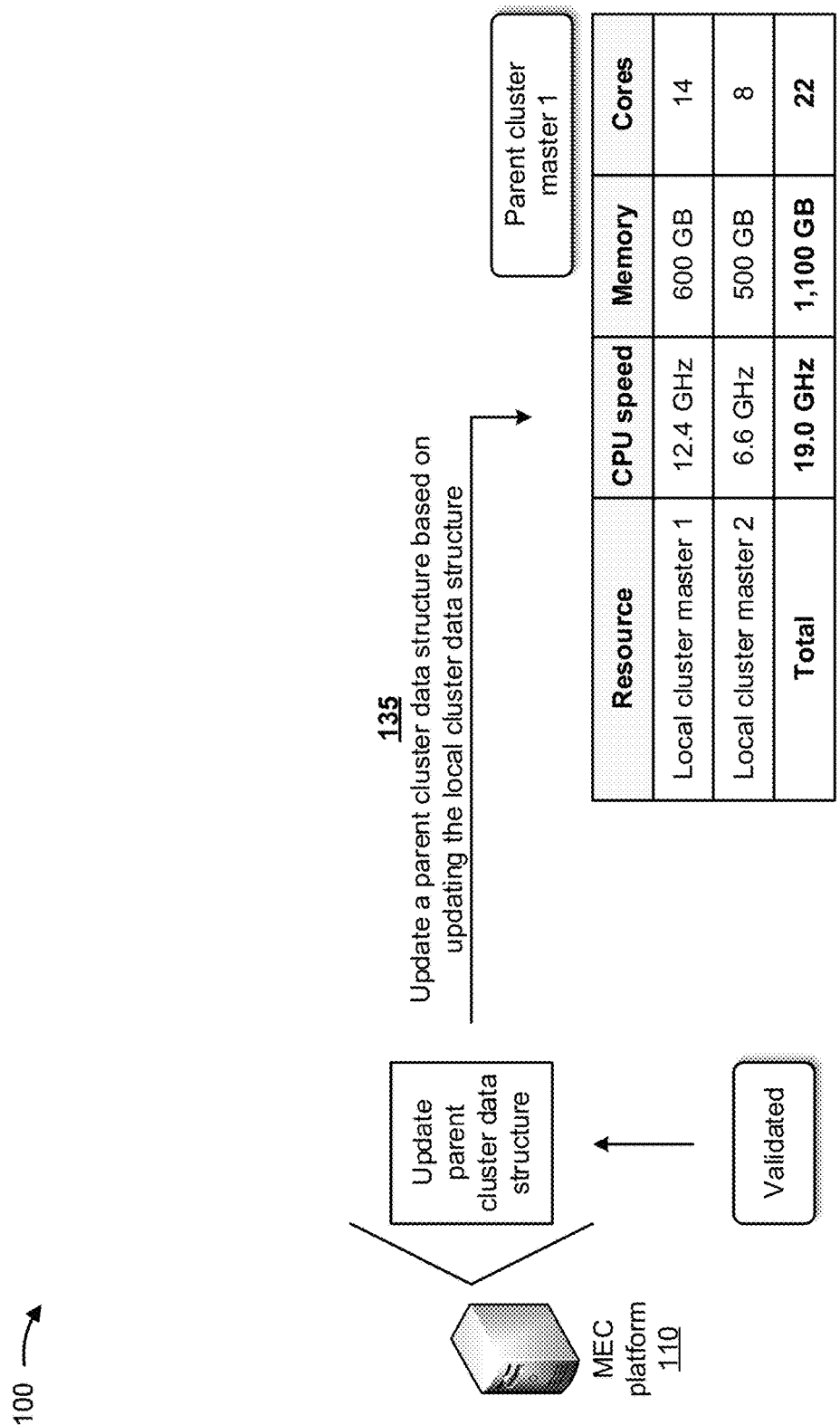
Figure 1J:
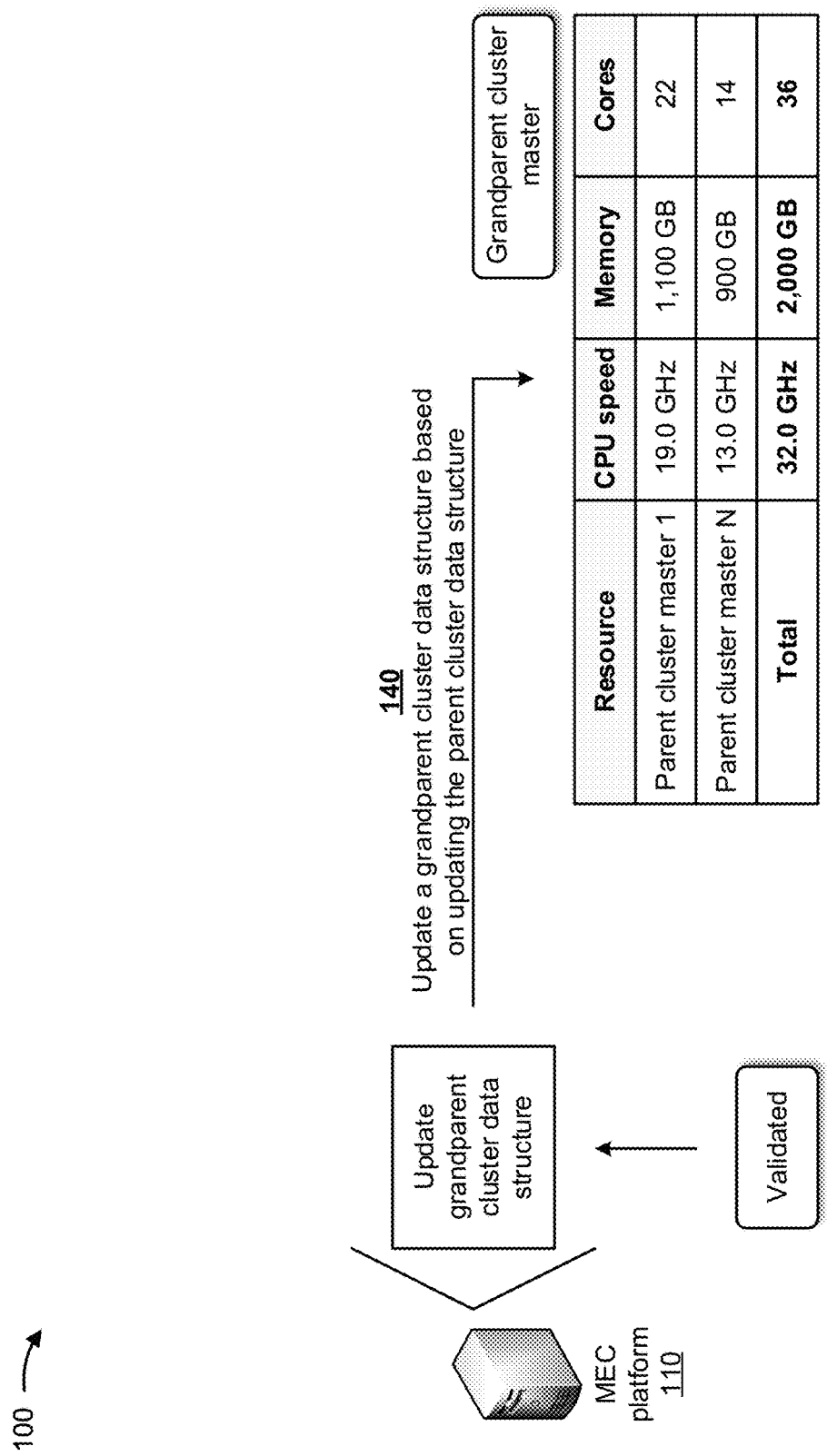
Figure 1K:
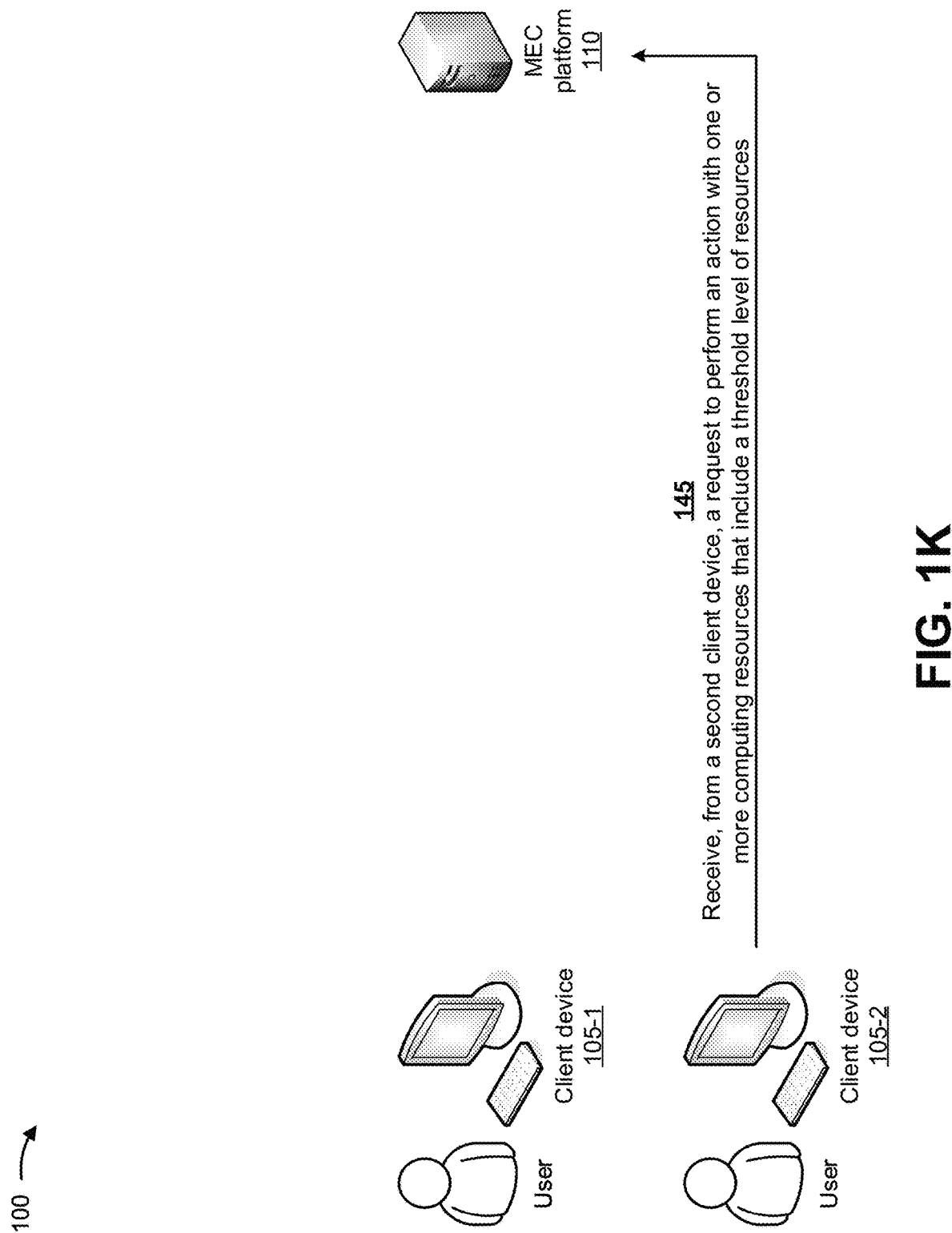
Figure 1L:
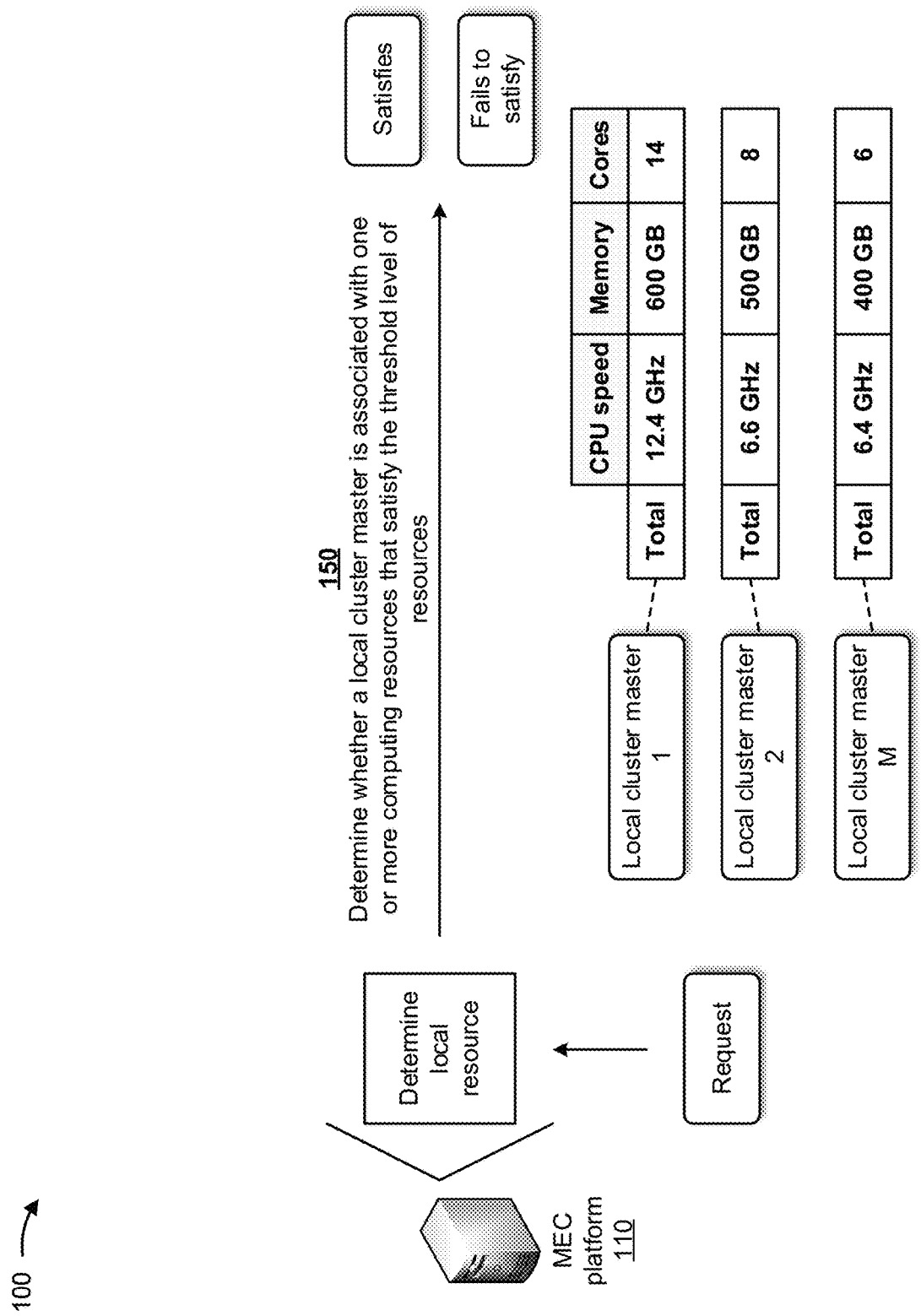
Figure 1M:
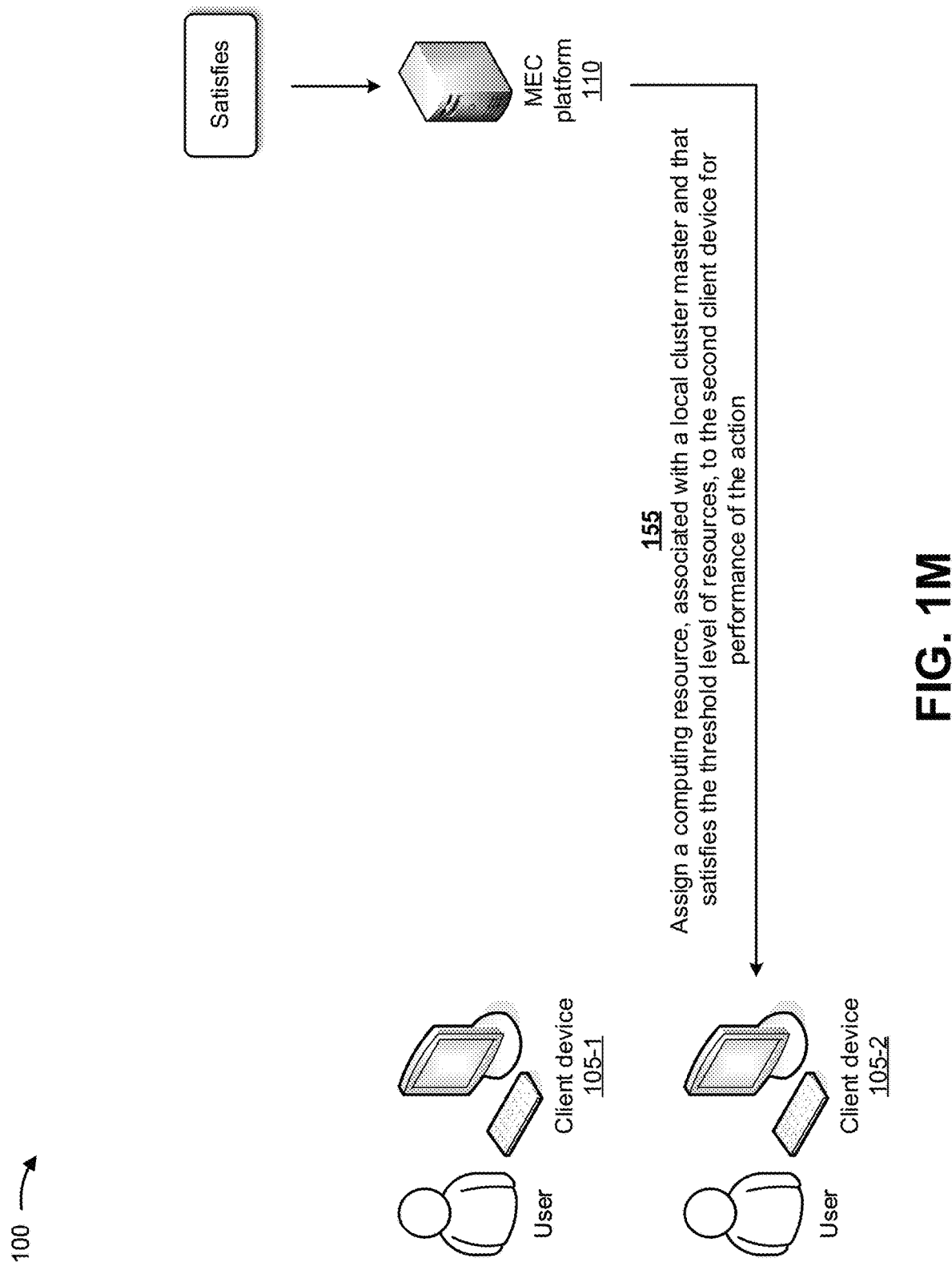
Figure 1N:
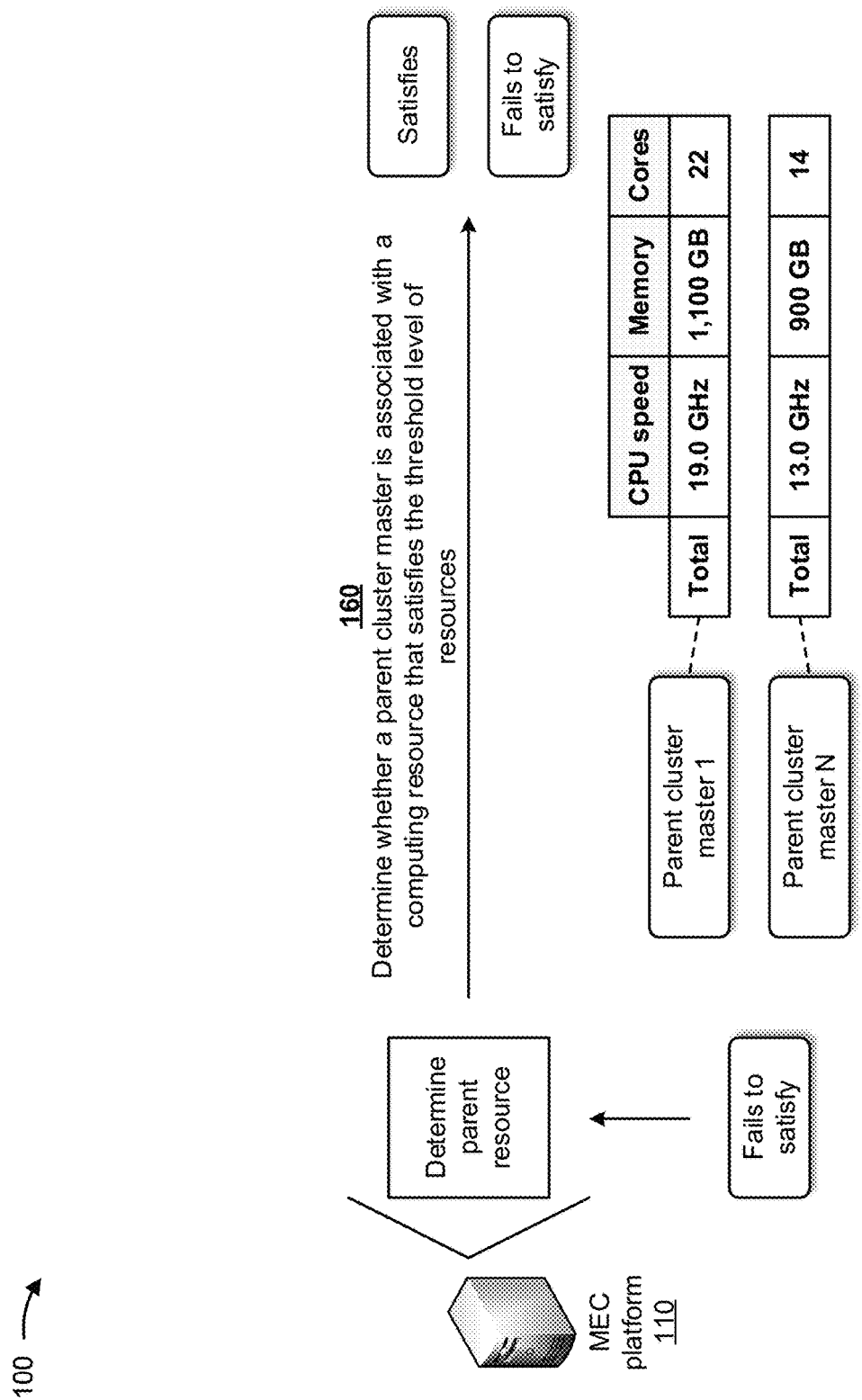
Figure 10:
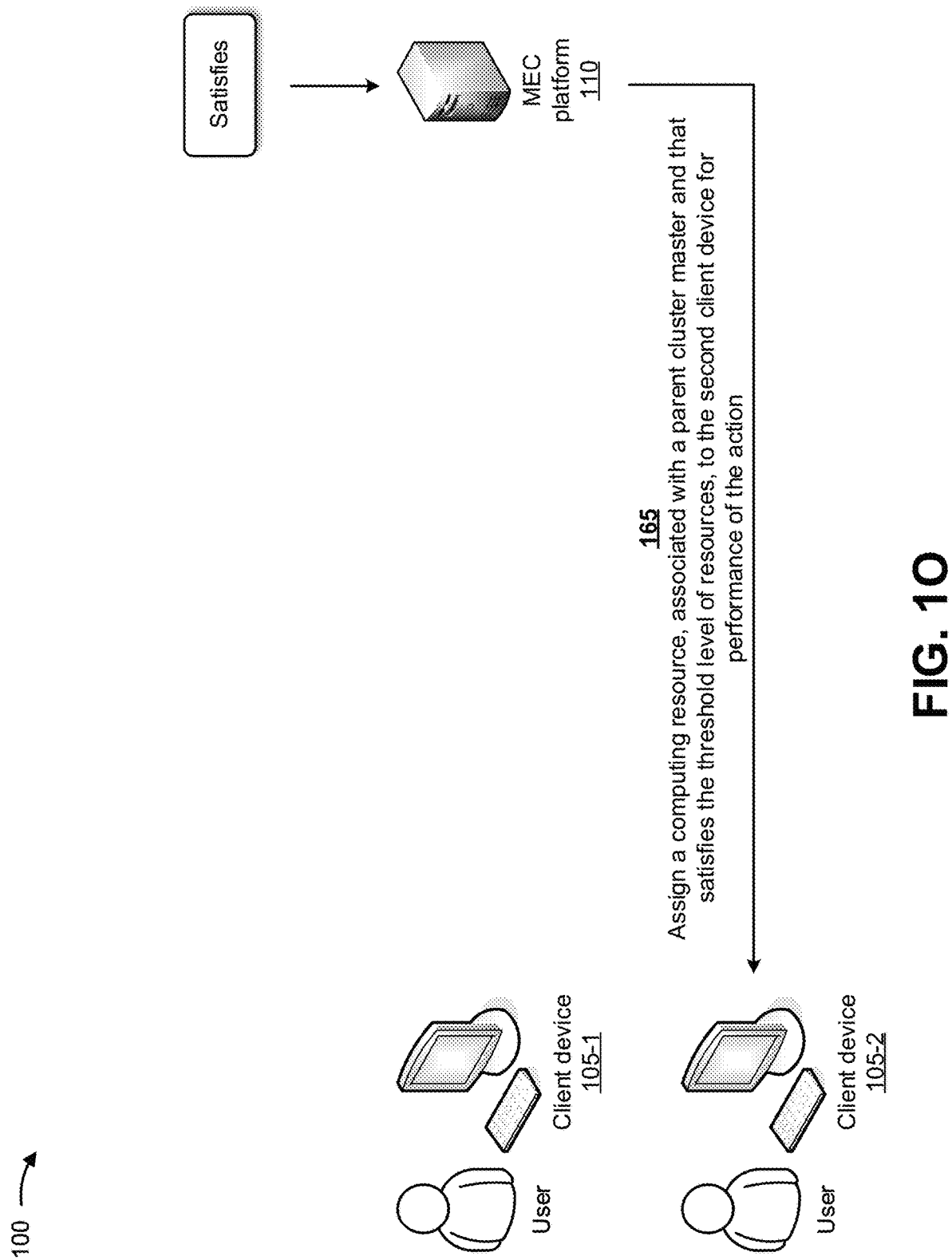
Figure 1P:
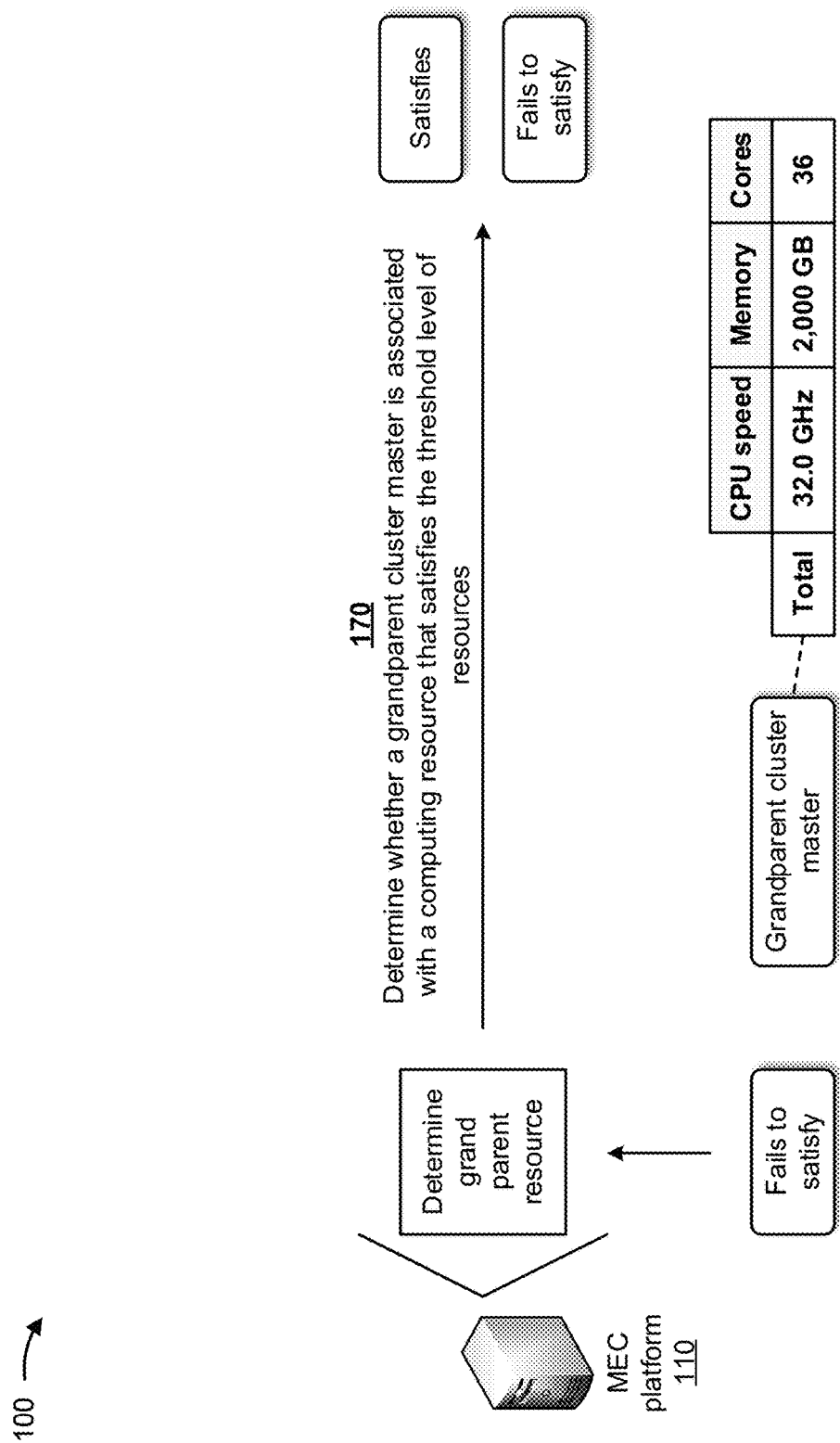
Figure 1Q:
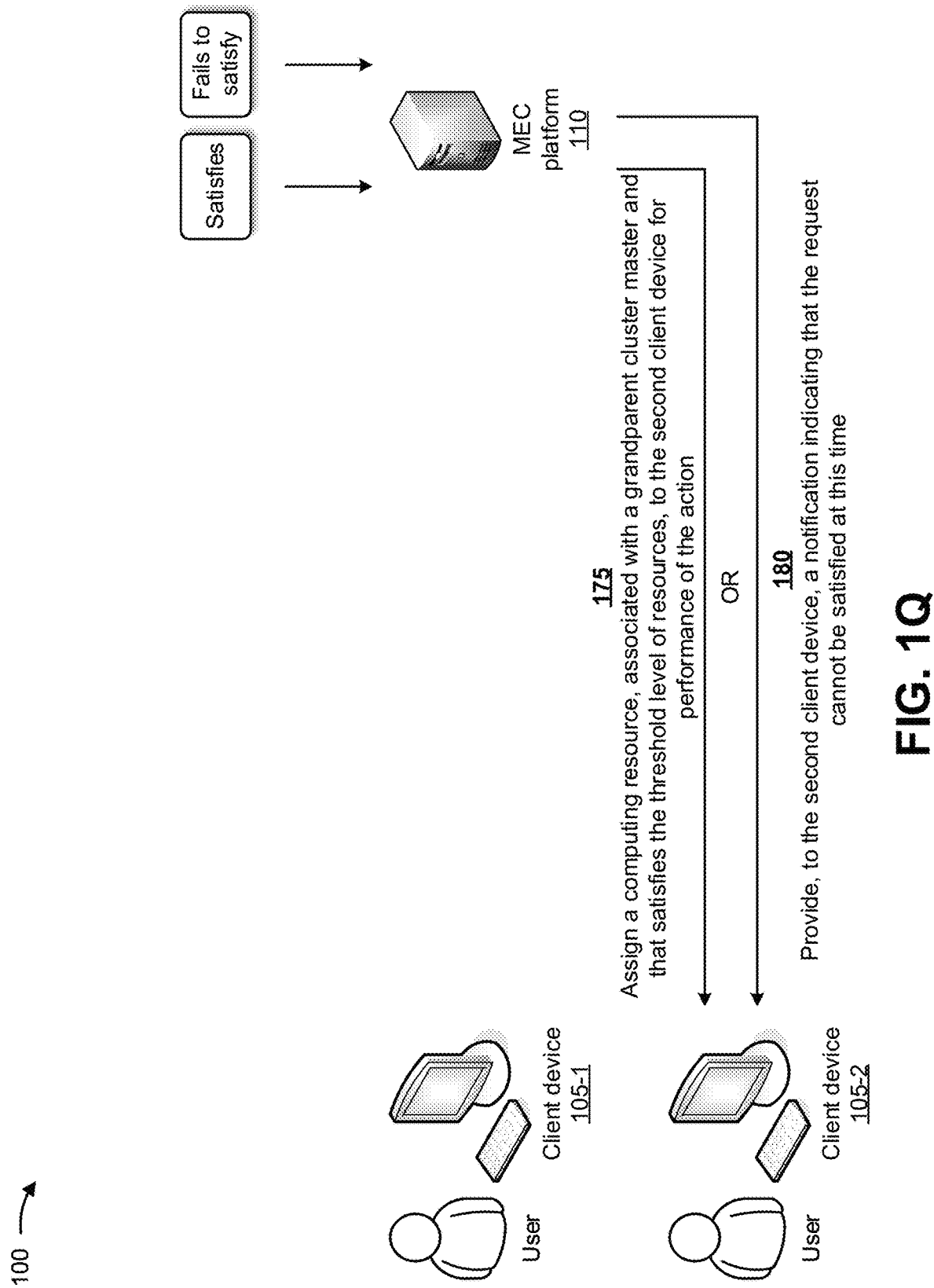

FIGS. 1A-1Q are diagrams of one or more example implementations 100 described herein. As shown in FIG. 1A, client devices 105 (e.g., a first client device 105-1 and a second client device 105-2) may be associated with a MEC platform 110. Client devices 105 may include mobile devices, computers, telephones, set-top boxes, and/or the like. First client device 105-1 may be associated with a user that wishes to enable first client device 105-1 to be utilized by MEC platform 110 (e.g., as a computing resource). Second client device 105-2 may be associated with a user that wishes to utilize computing resources of MEC platform 110. MEC platform 110 may include one or more server devices, one or more cloud computing environments, and/or the like that provide discovery and hierarchical management of distributed multi-access edge computing for a cloud computing environment.

As further shown in FIG. 1A, and by reference number 115, MEC platform 110 may receive, from first client device 105-1, first client data identifying an address, processing resources, memory resources, and/or the like associated with first client device 105-1. In some implementations, MEC platform 110 may be associated with a network. When client device 105-1 attaches to the network, first client device 105-1 may provide, to MEC platform 110, first client data identifying an Internet protocol (IP) address, processing resources (e.g., a central processing unit (CPU) or processor speed, a quantity of cores in the CPU, and/or the like), memory resources (e.g., sizes of memory devices), and/or the like associated with first client device 105-1.

As shown in FIG. 1B, MEC platform 110 may be associated with multiple local cluster master data structures (e.g., local cluster master 1, local cluster master 2, . . . , local cluster master M) that store first data identifying multiple computing resources (e.g., computing resource 1 through computing resource P) provided at an edge of a network associated with MEC platform 110. In some implementations, the first data may include data identifying the multiple computing resources, addresses of the computing resources, processor speeds associated with respective processors of the computing resources, memory sizes associated with respective memories of the computing resources, quantities of cores associated with the respective processors of the computing resources, and/or the like. In some implementations, each of the multiple local cluster master data structures may include a portion of the first data identifying a corresponding portion of the computing resources.

Additionally, MEC platform 110 may be associated with multiple parent cluster master data structures (e.g., parent cluster master 1 through parent cluster master N) that store second data identifying an aggregation of a portion of the first data that identifies the multiple computing resources. In some implementations, the second data may include an aggregation of the first data identifying the processor speeds associated with respective processors of the computing resources, an aggregation of the first data identifying the memory sizes associated with respective memories of the computing resources, an aggregation of the first data identifying the quantities of cores associated with the respective processors of the computing resources, and/or the like. Additionally, MEC platform 110 may be associated with a grandparent cluster master data structure that stores third data identifying an aggregation of the second data provided in each of the parent cluster master data structures. In some implementations, the third data may include an aggregation of the second data identifying the aggregation of the processor speeds associated with respective processors of the computing resources, an aggregation of the second data identifying the aggregation of the memory sizes associated with respective memories of the computing resources, an aggregation of the second data identifying the aggregations of the quantities of cores associated with the respective processors of the computing resources, and/or the like.

As further shown in FIG. 1B, the grandparent cluster master, the parent cluster masters, and the local cluster masters may be arranged in a hierarchical fashion. For example, each local cluster master may be associated with one or more computing resources (e.g., local cluster master 1 may be associated with computing resources 1, 2, and 3, local cluster master 2 may be associated with computing resources 3, 4, and 5, and local cluster master M may be associated with computing resource 6 and computing resource P), each parent cluster master may be associated with one or more local cluster masters (e.g., parent cluster master 1 may be associated with local cluster masters 1 and 2, and parent cluster master N may be associated with local cluster master 2 and local cluster master M), and the grandparent cluster master may be associated with one or more parent cluster masters (e.g., the grandparent cluster master may be associated with parent cluster masters 1 . . . N). In some cases, multiple local cluster masters may be associated with one or more of the same computing resources (e.g., local cluster masters 1 and 2 may both be associated with computing resource 3), and multiple parent cluster masters may be associated with one or more of the same local cluster masters (e.g., parent cluster masters 1 and N may be associated with local cluster master 2). Although FIG. 1B shows a hierarchical arrangement in which the grandparent cluster master is the top level cluster master, in some implementations, additional levels and arrangements may be provided (e.g., multiple grandparent cluster masters that are associated with a great-grandparent cluster master, hub and spoke arrangement, and/or the like).

In some implementations, upon receiving the first client data from first client device 105-1, MEC platform 110 may perform a handshake operation with first client device 105-1, may validate first client device 105-1, may register information about first client device 105-1 with a local data structure (e.g., a local cluster master, as described below), may synchronize the local cluster master with a parent cluster master, and/or the like. In some implementations, each cluster master (e.g., the grandparent cluster master, the parent cluster masters, and the local cluster masters) may be associated with an application programming interface (API) that facilitates orchestration with other cluster masters. The API may provide information associated with the computing resources, may provide requests for information to the computing resources, may provide usage data associated with the computing resources, may provide reasons for failures of the computing resources or errors associated with the computing resources, and/or the like. In some implementations, multiple local cluster masters may be centrally located around each parent cluster master (e.g., based on geographic locations of the multiple local cluster masters and each parent cluster master). In this way, data transport latency, which may be a function of geographic distance, a quantity of network devices involved routing, network peering configuration, and/or the like, may be optimized.

As shown in FIG. 1C, each local cluster master may include a data structure (e.g., a database, a table, a list, and/or the like) that stores, for each computing resource associated with the local cluster master, a computing resource identifier, an IP address of the computing resource, a CPU clock speed (e.g., 1.9, 2.1, 3.3, and/or the like gigahertz (GHz)) of a CPU of the computing resource, a memory size of a memory of the computing resource, a quantity of cores associated with the CPU (e.g., a quantity of processing cores in the CPU) of the computing resource, a graphic processing unit (GPU) clock speed (e.g., 1.5, 1.7, 1.9, and/or the like GHz) of a GPU of the computing resource, a memory speed (e.g., 1.3, 1.5, 1.7, and/or the like GHz) of the GPU of the computing resource, a quantity of shader cores of the GPU, a quantity of texture mapping unit (TMU) cores of the GPU, a quantity of render output unit (ROP) cores of the GPU, a quantity of compute unified device architecture (CUDA) cores of the GPU, an aggregate of memory for the GPU, a quantity of pods (e.g., 45, 180, and/or the like teraflops) associated with a tensor processing unit (TPU) of the computing resource, a memory speed (e.g., 34, 600, and/or the like gigabits per second) of the TPU, an aggregate of memory for the TPU, and/or the like. Additionally, the data structure for each local cluster master may store total values associated with the CPU speeds, the memory sizes, the quantities of cores, and/or the like for all computing resources associated with the local cluster master.

For example, as further shown in FIG. 1C, since local cluster master 1 is associated with computing resources 1-3, the data structure for local cluster master 1 may store computing resource identifiers (e.g., CR 1, CR 2, and CR 3), IP addresses (e.g., 192.168.0.0, 192.168.2.0, and 192.168.0.1), CPU speeds (e.g., 2.1 gigahertz (GHz), 1.9 GHz, and 3.3 GHz), memory sizes (e.g., 100 gigabits (GB), 200 GB, and 150 GB), and quantities of cores (e.g., 2, 4, and 4) associated with computing resources 1-3. The data structure for local cluster master 1 may also store total values associated with the CPU speeds (e.g., 7.3 GHz), the memory sizes (e.g., 450 GB), and the quantities of cores (e.g., 10) for computing resources 1-3.

As further shown in FIG. 1C, since local cluster master 2 is associated with computing resources 3-5, the data structure for local cluster master 2 may store computing resource identifiers (e.g., CR 3, CR 4, and CR 5), IP addresses (e.g., 192.168.0.1, 191.168.2.0, and 191.167.1.0), CPU speeds (e.g., 3.3 GHz, 1.0 GHz, and 2.3 GHz), memory sizes (e.g., 150 GB, 50 GB, and 300 GB), and quantities of cores (e.g., 4, 2, and 4) associated with computing resources 3-5. The data structure for local cluster master 2 may also store total values associated with the CPU speeds (e.g., 6.6 GHz), the memory sizes (e.g., 500 GB), and the quantities of cores (e.g., 8) for computing resources 3-5.

As further shown in FIG. 1C, since local cluster master M is associated with computing resource 6 and computing resource P, the data structure for local cluster master M may store computing resource identifiers (e.g., CR 6 and CR P), IP addresses (e.g., 192.168.2.2 and 191.168.2.2), CPU speeds (e.g., 4.1 GHz and 2.3 GHz), memory sizes (e.g., 250 GB and 150 GB), and quantities of cores (e.g., 4 and 2) associated with computing resources 6 and P. The data structure for local cluster master M may also store total values associated with the CPU speeds (e.g., 6.4 GHz), the memory sizes (e.g., 400 GB), and the quantities of cores (e.g., 6) for computing resources 6 and P.

As shown in FIG. 1D, each parent cluster master may include a data structure (e.g., a database, a table, a list, and/or the like) that stores, for each local cluster master associated with the parent cluster master, the total values of the CPU speeds, the total values of the memory sizes, and the total values of the quantities of cores for all computing resources associated with each local cluster master. Additionally, the data structure for each parent cluster master may store total values associated with the CPU speeds, the total values of the memory sizes, and the total values of the quantities of cores for all computing resources associated with the local cluster masters identified in the data structure.

For example, as further shown in FIG. 1D, since parent cluster master 1 is associated with local cluster masters 1 and 2, the data structure for parent cluster master 1 may store the total CPU speeds (e.g., 7.3 GHz and 6.6 GHz), memory sizes (e.g., 450 GB and 500 GB), and quantities of cores (e.g., 10 and 8) associated with local cluster masters 1 and 2. The data structure for parent cluster master 1 may also store total values associated with the CPU speeds (e.g., 13.9 GHz), the memory sizes (e.g., 950 GB), and the quantities of cores (e.g., 18) for local cluster masters 1 and 2.

As further shown in FIG. 1D, since parent cluster master N is associated with local cluster master 2 and local cluster master M, the data structure for parent cluster master N may store the total CPU speeds (e.g., 6.6 GHz and 6.4 GHz), memory sizes (e.g., 500 GB and 400 GB), and quantities of cores (e.g., 8 and 6) associated with local cluster master 2 and local cluster master M. The data structure for parent cluster master N may also store total values associated with the CPU speeds (e.g., 13.0 GHz), the memory sizes (e.g., 900 GB), and the quantities of cores (e.g., 14) for local cluster master 2 and local cluster master M.

As shown in FIG. 1E, the grandparent cluster master may include a data structure (e.g., a database, a table, a list, and/or the like) that stores, for each parent cluster master, the total values of the CPU speeds, the total values of the memory sizes, and the total values of the quantities of cores for all computing resources associated with each parent cluster master. Additionally, the data structure for the grandparent cluster master may store total values associated with the CPU speeds, the total values of the memory sizes, and the total values of the quantities of cores for all computing resources associated with the parent cluster masters identified in the data structure.

For example, as further shown in FIG. 1E, since the grandparent cluster master is associated with parent cluster master 1 and parent cluster master N, the data structure for the grandparent cluster master may store the total CPU speeds (e.g., 13.9 GHz and 13.0 GHz), memory sizes (e.g., 950 GB and 900 GB), and quantities of cores (e.g., 18 and 14) associated with parent cluster master 1 and parent cluster master N. The data structure for the grandparent cluster master may also store total values associated with the CPU speeds (e.g., 26.9 GHz), the memory sizes (e.g., 1,850 GB), and the quantities of cores (e.g., 32) for parent cluster master 1 and parent cluster master N.

As shown in FIG. 1F, and by reference number 120, upon receiving the first client data from first client device 105-1, as described above in connection with FIG. 1A, MEC platform 110 may validate first client device 105-1 for use as a computing resource based on the first client data. In some implementations, MEC platform 110 may determine that first client device 105-1 is validated when the first client data includes data indicating that first client device 105-1 satisfies a threshold CPU speed, a threshold memory size, a threshold quantity of cores, and/or the like; data indicating that first client device 105-1 is secure or registered with MEC platform 110; and/or the like. In some implementations, MEC platform 110 may determine that first client device 105-1 is not validated when the first client data includes data indicating that first client device 105-1 fails to satisfy a threshold CPU speed, a threshold memory size, a threshold quantity of cores, and/or the like; data indicating that first client device 105-1 is a security threat or is not registered with MEC platform 110; and/or the like.

As shown in FIG. 1G, and by reference number 125, if MEC platform 110 determines that first client device 105-1 is not validated, MEC platform 110 may provide, to first client device 105-1, a notification indicating that first client device 105-1 is not validated for use as a computing resource. For example, if the CPU speed of first client device 105-1 fails to satisfy the threshold CPU speed, MEC platform 110 may determine that first client device 105-1 is not validated for use as an edge computing resource. In such an example, the notification may indicate that first client device 105-1 is not permitted to be utilized as an edge computing resource.

As shown in FIG. 1H, and by reference number 130, if MEC platform 110 determines that first client device 105-1 is validated for use an edge computing resource, MEC platform 110 may update a local cluster data structure based on the first client data. For example, MEC platform 110 may update local cluster master 1 based on the first client data if MEC platform 110 determines that first client device 105-1 is validated. MEC platform 110 may update local cluster master 1 by adding data associated with first client device 105-1 to the data structure for each local cluster master (e.g., local cluster master 1) to be associated with first client device 105-1. For example, MEC platform 110 may add an entry for client device 105-1 that includes a computing resource identifier (e.g., Client 1), an IP address (e.g., 192.168.1.1), a CPU speed (e.g., 5.1 GHz), a memory size (e.g., 150 GB), and a quantity of cores (e.g., 4) associated with first client device 105-1.

As further shown in FIG. 1H, based on adding the entry for first client device 105-1, MEC platform 110 may update the total values associated with the CPU speeds, the memory sizes, and the quantities of cores for the resources included in the data structure for local cluster master 1 (e.g., computing resources 1-3 and first client device 105-1). For example, based on adding the entry, the total value associated with the CPU speeds may be updated from 7.3 GHz to 12.4 GHz, the total value associated with the memory sizes may be updated from 450 GB to 600 GB, and the total value associated with the quantities of cores may be updated from 10 to 14.

As shown in FIG. 1I, and by reference number 135, MEC platform 110 may update a parent cluster data structure (e.g., parent cluster master 1) based on updating the local cluster data structure (e.g., local cluster master 1). MEC platform 110 may update parent cluster master 1 by updating data associated with the updated local cluster master 1 in the data structure associated with parent cluster master 1 (e.g., by updating the entries for local cluster master 1 in parent cluster master 1). For example, MEC platform 110 may update the entry for CPU speed from 7.3 GHz to 12.4 GHz, may update the entry for memory size from 450 GB to 600 GB, and may update the entry for the quantity of cores from 10 to 14.

As further shown in FIG. 1I, based on updating the entries for local cluster master 1 in parent cluster master 1, MEC platform 110 may update the total values associated with the CPU speeds, the memory sizes, and the quantities of cores for the local cluster masters included in the data structure for parent cluster master 1 (e.g., local cluster master 1 and local cluster master 2). For example, based on updating the entries for local cluster master 1, the total value associated with the CPU speeds may be updated from 13.9 GHz to 19.0 GHz, the total value associated with the memory sizes may be updated from 950 GB to 1,100 GB, and the total value associated with the quantities of cores may be updated from 18 to 22.

As shown in FIG. 1J, and by reference number 140, MEC platform 110 may update a grandparent cluster data structure (e.g., the grandparent cluster master) based on updating the parent cluster data structure (e.g., parent cluster master 1). MEC platform 110 may update the grandparent cluster master by updating data associated with the updated parent cluster master 1 in the data structure associated with the grandparent cluster master (e.g., by updating the entries for parent cluster master 1 in the grandparent cluster master). For example, MEC platform 110 may update the entry for CPU speed from 13.9 GHz to 19.0 GHz, may update the entry for memory size from 950 GB to 1,100 GB, and may update the entry for the quantity of cores from 18 to 22.

As further shown in FIG. 1J, based on updating the entries for parent cluster master 1 in the grandparent cluster master, MEC platform 110 may update the total values associated with the CPU speeds, the memory sizes, and the quantities of cores for the parent cluster masters included in the data structure for the grandparent cluster master (e.g., parent cluster master 1 and parent cluster master N). For example, based on updating the entries for parent cluster master 1, the total value associated with the CPU speeds may be updated from 26.9 GHz to 32.0 GHz, the total value associated with the memory sizes may be updated from 1,850 GB to 2,000 GB, and the total value associated with the quantities of cores may be updated from 32 to 36.

In some implementations, upon updating the local cluster master(s) associated with the added computing resource, updating the parent cluster master(s) associated with the updated local cluster master(s), and updating the grandparent cluster master, as described above, MEC platform 110 may provide, to first client device 105-1, a notification indicating that first client device 105-1 has been added as a computing resource for the cloud computing environment. In some implementations, MEC platform 110 may enable first client device 105-1 to be utilized as at least one computing resource for the cloud computing environment, may calculate compensation (e.g., a monetary payment, resource credits, utilization of additional computing resources for free or a reduced price, and/or the like) for utilization of first client device 105-1 as the at least one computing resource for the cloud computing environment, may cause the compensation to be provided to first client device 105-1, and/or the like.

In some implementations, if a computing resource is removed as a computing resource for the cloud computing environment, MEC platform 110 may update local cluster master(s) associated with the removed computing resource, may update parent cluster master(s) associated with the updated local cluster master(s), and may update the grandparent cluster master, as described above.

As shown in FIG. 1K, and by reference number 145, MEC platform 110 may receive, from second client device 105-2, a request to perform an action with one or more computing resources that include a threshold level of resources. In some implementations, the threshold level of resources may include one or more of a threshold CPU speed, a threshold memory size, a threshold quantity of cores, and/or the like. In some implementations, the action may include the one or more computing resources performing a service for second client device 105-2, storing data for second client device 105-2, processing data for second client device 105-2, and/or the like.

As shown in FIG. 1L, and by reference number 150, MEC platform 110 may determine whether a local cluster master is associated with one or more computing resources that satisfy the threshold level of resources. For example, MEC platform 110 may determine whether CPU speeds listed in local cluster masters 1-M satisfy the threshold CPU speed, whether the memory sizes listed in local cluster masters 1-M satisfy the threshold memory size, whether the quantities of cores listed in local cluster masters 1-M satisfy the threshold quantity of cores, and/or the like. In some implementations, MEC platform 110 may determine that a local cluster master is associated with computing resources that satisfy the threshold level of resources when the threshold CPU speed, the threshold memory size, the threshold quantity of cores, and/or the like are satisfied for the local cluster master. For example, if second client device 105-2 requests a CPU speed of 10.0 GHz, a memory size of 200 GB, and a quantity of cores of 4, MEC platform 110 may determine local cluster master 1 is associated with computing resources that satisfy the threshold level of resources.

Alternatively, MEC platform 110 may determine that a local cluster master is associated with computing resources that fail to satisfy the threshold level of resources when one or more of the threshold CPU speed, the threshold memory size, the threshold quantity of cores, and/or the like are not satisfied for the local cluster master. For example, if second client device 105-2 requests a CPU speed of 10.0 GHz, a memory size of 200 GB, and a quantity of cores of 8, MEC platform 110 may determine local cluster master 2 is associated with computing resources that fail to satisfy the threshold level of resources.

As shown in FIG. 1M, and by reference number 155, if MEC platform 110 determines that a local cluster master satisfies the threshold level of resources, MEC platform 110 may assign one or more computing resources, associated with the local cluster master that satisfies the threshold level of resources, to second client device 105-2 for performance of the action. For example, if second client device 105-2 requests a CPU speed of at least 10.0 GHz, a memory size of at least 500 GB, and a quantity of cores of at least 10, MEC platform 110 may determine that local cluster master 1 is associated with computing resources that satisfy the threshold level of resources, and may assign computing resources associated with local cluster master 1 to second client device 105-2 (e.g., for performance of the action).

As shown in FIG. 1N, and by reference number 160, if MEC platform 110 determines that no local cluster master satisfies the threshold level of resources, MEC platform 110 may determine whether a parent cluster master is associated with one or more computing resources that satisfy the threshold level of resources. For example, if second client device 105-2 requests a CPU speed of at least 15.0 GHz, a memory size of at least 500 GB, and a quantity of cores of at least 10, MEC platform 110 may determine that no local cluster master is associated with computing resources that can provide the requested CPU speed of 15.0 GHz. In such an example, MEC platform 110 may determine whether a parent cluster master is associated with computing resources that satisfy the threshold level of resources. For example, parent cluster master 1 may be associated with computing resources that satisfy the CPU speed of at least 15.0 GHz, the memory size of at least 500 GB, and the quantity of cores of at least 10, but parent master cluster N may be associated with computing resources that fail to satisfy the CPU speed of at least 15.0 GHz.

As shown in FIG. 1O, and by reference number 165, if MEC platform 110 determines that a parent cluster master satisfies the threshold level of resources, MEC platform 110 may assign one or more computing resources, associated with the parent cluster master that satisfies the threshold level of resources, to second client device 105-2 for performance of the action. For example, if second client device 105-2 requests a CPU speed of at least 15.0 GHz, a memory size of at least 1,000 GB, and a quantity of cores of at least 20, MEC platform 110 may determine that parent cluster master 1 is associated with computing resources that satisfy the threshold level of resources, and may assign computing resources associated with parent cluster master 1 to second client device 105-2.

As shown in FIG. 1P, and by reference number 170, if MEC platform 110 determines that no parent cluster master satisfies the threshold level of resources, MEC platform 110 may determine whether a grandparent cluster master is associated with one or more computing resources that satisfy the threshold level of resources. For example, if second client device 105-2 requests a CPU speed of at least 15.0 GHz, a memory size of at least 1,500 GB, and a quantity of cores of at least 20, MEC platform 110 may determine that no parent cluster master is associated with computing resources that satisfy the memory size of at least 1,500 GB, and may proceed to determine whether a grandparent cluster master is associated with computing resources that satisfy the threshold level of resources.

As shown in FIG. 1Q, and by reference number 175, if MEC platform 110 determines that the grandparent cluster master satisfies the threshold level of resources, MEC platform 110 may assign one or more computing resources, associated with the grandparent cluster master, to second client device 105-2 for performance of the action. For example, if second client device 105-2 requests a CPU speed of at least 25.0 GHz, a memory size of at least 2,000 GB, and a quantity of cores of at least 30, MEC platform 110 may determine that the grandparent cluster master is associated with computing resources that satisfy the threshold level of resources, and may assign computing resources associated with the grandparent cluster master to second client device 105-2.

As further shown in FIG. 1Q, and as shown by reference number 180, if MEC platform 110 determines that the grandparent cluster master is associated with computing resources that fail to satisfy the threshold level of resources, MEC platform 110 may provide, to second client device 105-2, a notification indicating that the request cannot be satisfied at this time. For example, if second client device 105-2 requests a CPU speed of at least 25.0 GHz, a memory size of at least 2,000 GB, and a quantity of cores of at least 40, MEC platform 110 may determine that the grandparent cluster master fails to satisfy the quantity of cores of at least 40, and may provide the notification to second client device 105-2.

Currently there does not exist a technique that provides discovery and hierarchical management of distributed multi-access edge computing for a cloud computing environment in the manner described herein. Finally, the process for providing discovery and hierarchical management of distributed multi-access edge computing for a cloud computing environment conserves computing resources, networking resources, and/or the like that would otherwise be wasted in searching for available computing resources, not having computing resources available to perform tasks, and/or the like.

As indicated above, FIGS. 1A-1Q are provided merely as examples. Other examples may differ from what is described with regard to FIGS. 1A-1Q. The number and arrangement of devices and networks shown in FIGS. 1A-1Q are provided as an example. In practice, there may be additional devices and/or networks, fewer devices and/or networks, different devices and/or networks, or differently arranged devices and/or networks than those shown in FIGS. 1A-1Q. Furthermore, two or more devices shown in FIGS. 1A-1Q may be implemented within a single device, or a single device shown in FIGS. 1A-1Q may be implemented as multiple, distributed devices. Additionally, or alternatively, a set of devices (e.g., one or more devices) of FIGS. 1A-1Q may perform one or more functions described as being performed by another set of devices of FIGS. 1A-1Q.

Figure 2:
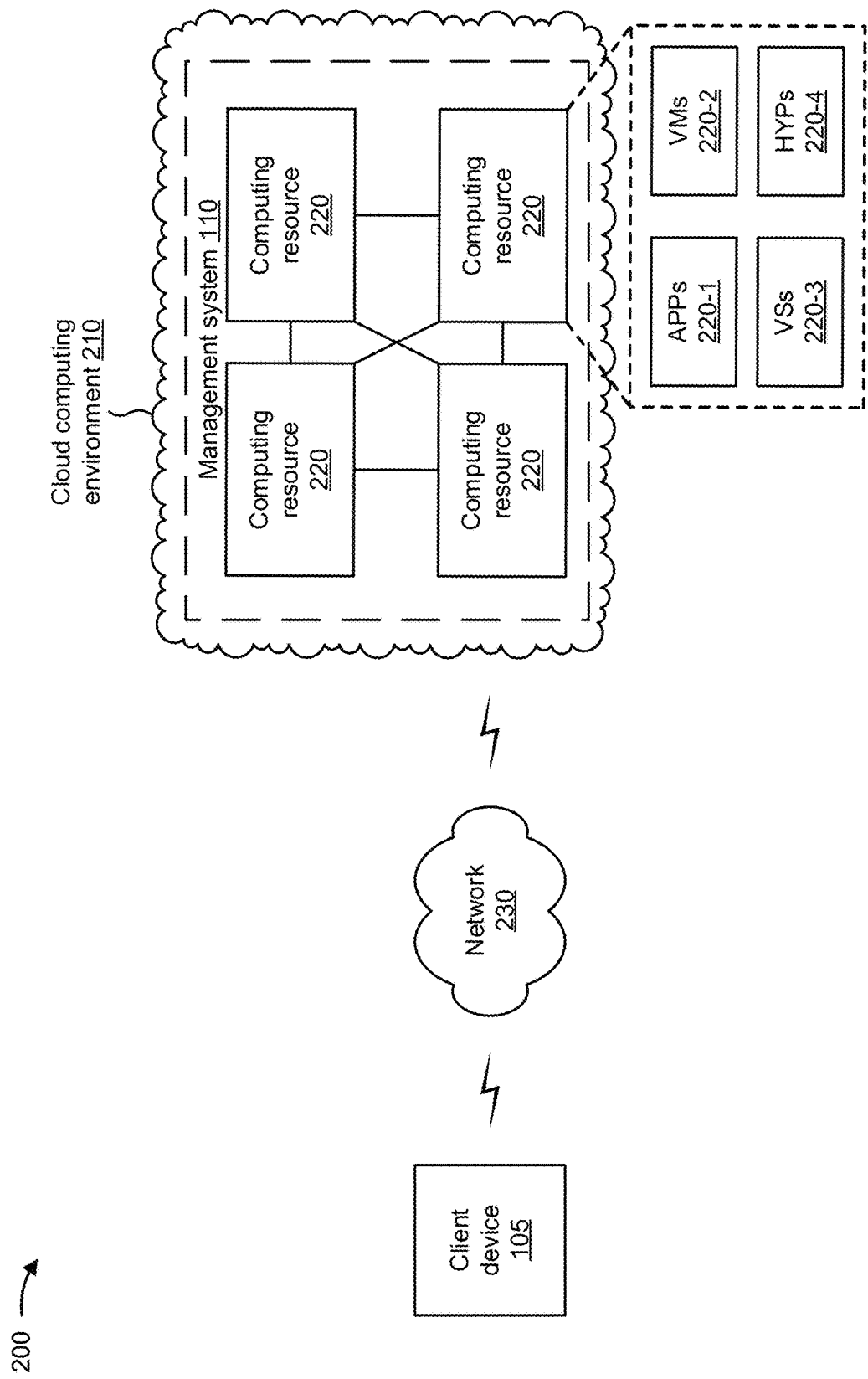
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include client device 105, MEC platform 110, and a network 230. Devices of environment 200 may interconnect via wired connections, wireless connections, or a combination of wired and wireless connections.

Client device 105 includes one or more devices capable of receiving, generating, storing, processing, and/or providing information, such as information described herein. For example, client device 105 may include a mobile phone (e.g., a smart phone, a radiotelephone, and/or the like), a laptop computer, a tablet computer, a desktop computer, a handheld computer, a set-top box, a gaming device, a wearable communication device (e.g., a smart watch, a pair of smart glasses, a heart rate monitor, a fitness tracker, smart clothing, smart jewelry, a head mounted display, and/or the like), a device with a sensor (e.g., a light sensor, a temperature sensor, a power sensor, and/or the like), or a similar type of device. In some implementations, client device 105 may receive information from and/or transmit information to MEC platform 110.

MEC platform 110 includes one or more devices that provide discovery and hierarchical management of distributed multi-access edge computing for a cloud computing environment. In some implementations, MEC platform 110 may be designed to be modular such that certain software components may be swapped in or out depending on a particular need. As such, MEC platform 110 may be easily and/or quickly reconfigured for different uses. In some implementations, MEC platform 110 may receive information from and/or transmit information to one or more client devices 105.

In some implementations, as shown, MEC platform 110 may be hosted in a cloud computing environment 210. Notably, while implementations described herein describe MEC platform 110 as being hosted in cloud computing environment 210 (e.g., a data center), in some implementations, MEC platform 110 may not be cloud-based (i.e., may be implemented outside of a cloud computing environment) or may be partially cloud-based.

Cloud computing environment 210 includes an environment that hosts MEC platform 110. Cloud computing environment 210 may provide computation, software, data access, storage, etc., services that do not require end-user knowledge of a physical location and configuration of system(s) and/or device(s) that host MEC platform 110. As shown, cloud computing environment 210 may include a group of computing resources 220 (referred to collectively as "computing resources 220" and individually as "computing resource 220").

Computing resource 220 includes one or more personal computers, workstation computers, mainframe devices, or other types of computation and/or communication devices. In some implementations, computing resource 220 may host MEC platform 110. The cloud resources may include compute instances executing in computing resource 220, storage devices provided in computing resource 220, data transfer devices provided by computing resource 220, etc. In some implementations, computing resource 220 may communicate with other computing resources 220 via wired connections, wireless connections, or a combination of wired and wireless connections.

As further shown in FIG. 2, computing resource 220 includes a group of cloud resources, such as one or more applications ("APPs") 220-1, one or more virtual machines ("VMs") 220-2, virtualized storage ("VSs") 220-3, one or more hypervisors ("HYPs") 220-4, and/or the like.

Application 220-1 includes one or more software applications that may be provided to or accessed by client device 105. Application 220-1 may eliminate a need to install and execute the software applications on client device 105. For example, application 220-1 may include software associated with MEC platform 110 and/or any other software capable of being provided via cloud computing environment 210. In some implementations, one application 220-1 may send/receive information to/from one or more other applications 220-1, via virtual machine 220-2.

Virtual machine 220-2 includes a software implementation of a machine (e.g., a computer) that executes programs like a physical machine. Virtual machine 220-2 may be either a system virtual machine or a process virtual machine, depending upon use and degree of correspondence to any real machine by virtual machine 220-2. A system virtual machine may provide a complete system platform that supports execution of a complete operating system ("OS"). A process virtual machine may execute a single program and may support a single process. In some implementations, virtual machine 220-2 may execute on behalf of a user (e.g., a user of client device 105 or an operator of MEC platform 110), and may manage infrastructure of cloud computing environment 210, such as data management, synchronization, or long-duration data transfers.

Virtualized storage 220-3 includes one or more storage systems and/or one or more devices that use virtualization techniques within the storage systems or devices of computing resource 220. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 220-4 may provide hardware virtualization techniques that allow multiple operating systems (e.g., "guest operating systems") to execute concurrently on a host computer, such as computing resource 220. Hypervisor 220-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks. In some implementations, network 230 may receive information from and/or transmit information to client device 105 and/or MEC platform 110.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
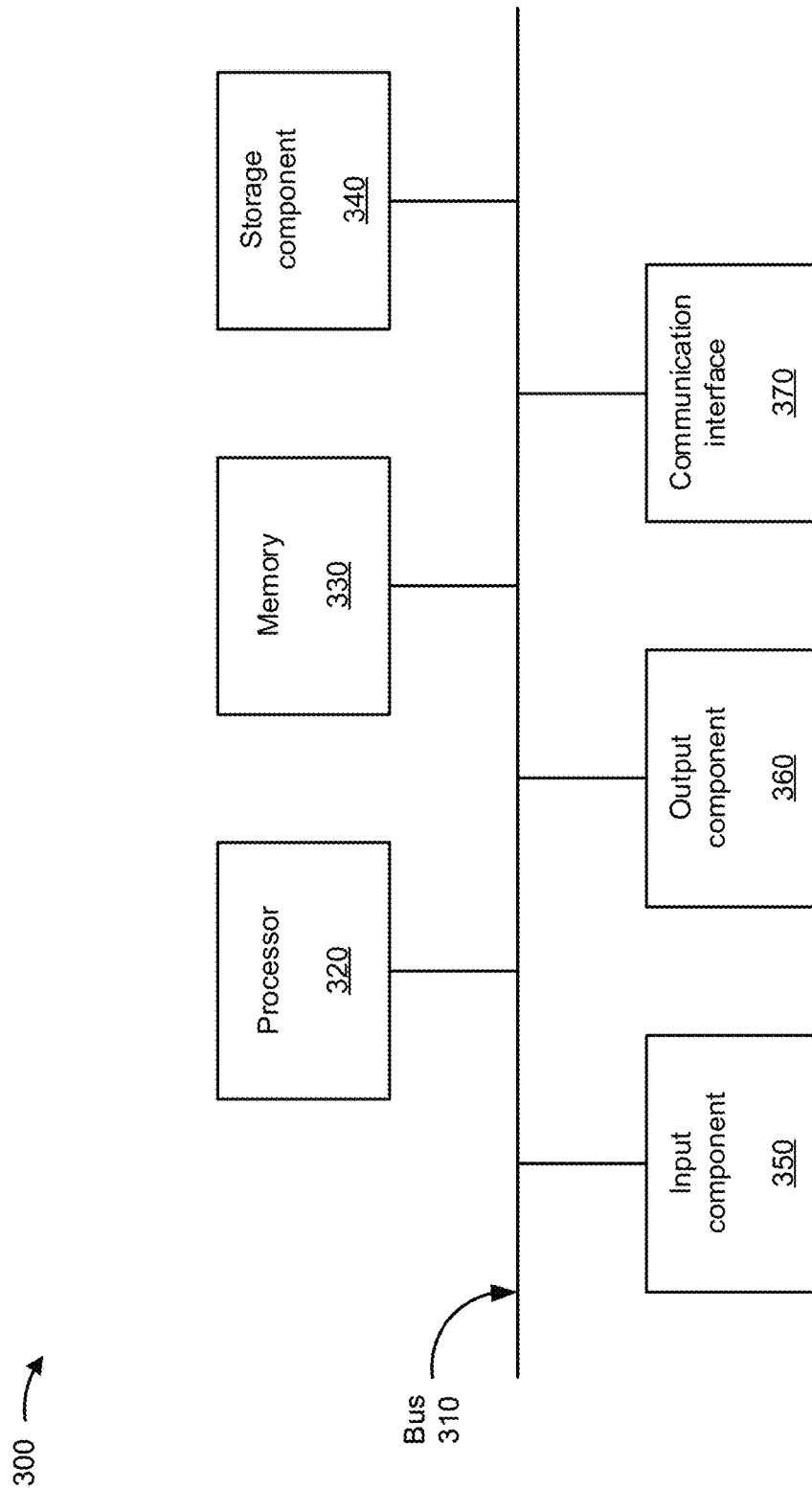
FIG. 3 is a diagram of example components of one or more devices of FIG. 2.

FIG. 3 is a diagram of example components of a device 300. Device 300 may correspond to client device 105, MEC platform 110, and/or computing resource 220. In some implementations, client device 105, MEC platform 110, and/or computing resource 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
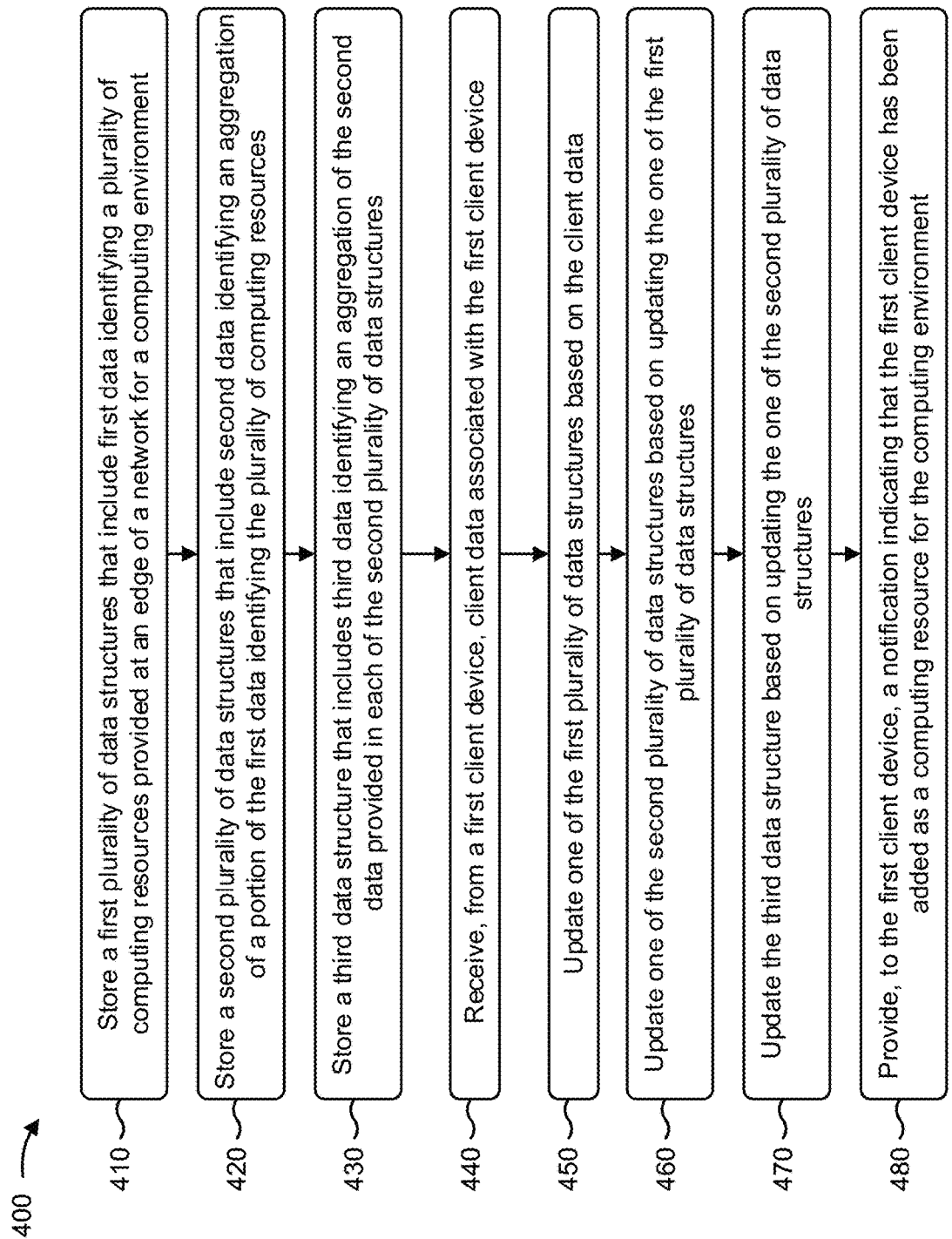
FIG. 4 is a flow chart of an example process for providing discovery and hierarchical management of distributed multi-access edge computing for a cloud computing environment.

FIG. 4 is a flow chart of an example process 400 for providing discovery and hierarchical management of distributed multi-access edge computing for a cloud computing environment. In some implementations, one or more process blocks of FIG. 4 may be performed by a device (e.g., MEC platform 110). In some implementations, one or more process blocks of FIG. 4 may be performed by another device or a group of devices separate from or including the device, such as a client device (e.g., client device 105).

As shown in FIG. 4, process 400 may include storing a first plurality of data structures that include first data identifying a plurality of computing resources provided at an edge of a network for a computing environment (block 410). For example, the device (e.g., using computing resource 320, processor 320, memory 330, and/or the like) may store a first plurality of data structures that include first data identifying a plurality of computing resources provided at an edge of a network for a computing environment, as described above. One or more of the plurality of computing resources may be associated with corresponding data structures of the first plurality of data structures. The first data may include data identifying respective addresses of the plurality of computing resources, processor speeds associated with respective processors of the plurality of computing resources, memory sizes associated with respective memories of the plurality of computing resources, or respective quantities of cores associated with the respective processors of the plurality of computing resources. Each of the first plurality of data structures includes a portion of the first data identifying a corresponding portion of the plurality of computing resources.

As further shown in FIG. 4, process 400 may include storing a second plurality of data structures, wherein each of the second plurality of data structures includes second data identifying an aggregation of a portion of the first data identifying the plurality of computing resources (block 420). For example, the device (e.g., using computing resource 320, processor 320, storage component 340, and/or the like) may store a second plurality of data structures, as described above. In some implementations, each of the second plurality of data structures includes second data identifying an aggregation of a portion of the first data identifying the plurality of computing resources. The second data may include data identifying an aggregation of processor speeds associated with processors of the plurality of computing resources, an aggregation of memory sizes associated with memories of the plurality of computing resources, or an aggregation of quantities of cores associated with the processors of the plurality of computing resources.

As further shown in FIG. 4, process 400 may include storing a third data structure that includes third data identifying an aggregation of the second data provided in each of the second plurality of data structures (block 430). For example, the device (e.g., using computing resource 320, processor 320, memory 330, and/or the like) may store a third data structure that includes third data identifying an aggregation of the second data provided in each of the second plurality of data structures, as described above.

As further shown in FIG. 4, process 400 may include receiving, from a first client device, client data associated with the first client device (block 440). For example, the device (e.g., using computing resource 320, processor 320, communication interface 370, and/or the like) may receive, from a first client device, client data associated with the first client device, as described above.

As further shown in FIG. 4, process 400 may include updating one of the first plurality of data structures based on the client data (block 450). For example, the device (e.g., using computing resource 320, processor 320, memory 330, storage component 340, and/or the like) may update one of the first plurality of data structures based on the client data, as described above.

As further shown in FIG. 4, process 400 may include updating one of the second plurality of data structures based on updating the one of the first plurality of data structures (block 460). For example, the device (e.g., using computing resource 320, processor 320, memory 330, and/or the like) may update one of the second plurality of data structures based on updating the one of the first plurality of data structures, as described above.

As further shown in FIG. 4, process 400 may include updating the third data structure based on updating the one of the second plurality of data structures (block 470). For example, the device (e.g., using computing resource 320, processor 320, storage component 340, and/or the like) may update the third data structure based on updating the one of the second plurality of data structures, as described above.

As further shown in FIG. 4, process 400 may include providing, to the first client device, a notification indicating that the first client device has been added as a computing resource for the computing environment (block 480). For example, the device (e.g., using computing resource 320, processor 320, memory 330, storage component 340, communication interface 370, and/or the like) may provide, to the first client device, a notification indicating that the first client device has been added as a computing resource for the computing environment, as described above.

Process 400 may include additional implementations, such as any single implementation or any combination of implementations described below and/or in connection with one or more other processes described elsewhere herein.

In some implementations, process 400 may include enabling the first client device to be utilized as at least one computing resource for the computing environment, calculating a compensation for utilization of the first client device as the at least one computing resource for the computing environment, and causing the compensation to be provided to the first client device.

In some implementations, process 400 may include receiving, from a second client device, a request to perform an action that requires a threshold level of resources, and determining whether the first data indicates that at least one of the plurality of computing resources satisfies the threshold level of resources. Process 400 may further include assigning the at least one of the plurality of computing resources to the second client device when the first data indicates that the at least one of the plurality of computing resources satisfies the threshold level of resources.

In some implementations, process 400 may include determining whether the second data indicates that the at least one of the plurality of computing resources satisfies the threshold level of resources when the first data indicates that the at least one of the plurality of computing resources fails to satisfy the threshold level of resources, and assigning the at least one of the plurality of computing resources to the second client device when the second data indicates that the at least one of the plurality of computing resources satisfies the threshold level of resources.

In some implementations, process 400 may include determining whether the third data indicates that the at least one of the plurality of computing resources satisfies the threshold level of resources when the second data indicates that the at least one of the plurality of computing resources fails to satisfy the threshold level of resources, and assigning the at least one of the plurality of computing resources to the second client device when the third data indicates that the at least one of the plurality of computing resources satisfies the threshold level of resources.

In some implementations, process 400 may include providing, to the second client device, another notification indicating that the request cannot be satisfied when the third data indicates that the at least one of the plurality of computing resources fails to satisfy the threshold level of resources.

In some implementations, process 400 may include validating the first client device as the computing resource for the computing environment prior to updating the one of the first plurality of data structures, updating the one of the second plurality of data structures, and updating the third data structure.

In some implementations, process 400 may include receiving information indicating a resource change associated with the plurality of computing resources, updating one of the first plurality of data structures based on the resource change, updating one of the second plurality of data structures based on updating the one of the first plurality of data structures, and updating the third data structure based on updating the one of the second plurality of data structures.

In some implementations, process 400 may include determining resource usage associated with the plurality of computing resources, generating a report based on the resource usage, and providing the report for display.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    storing, by a device, a first plurality of data structures that include first data identifying a plurality of computing resources provided at an edge of a network for a computing environment, each of the first plurality of data structures identifying, for a respective computing resource of the plurality of computing resources, a respective central process unit (CPU) speed, a respective memory size, and a respective quantity of cores,
        wherein the first plurality of data structures define a first level of a hierarchical management system;
    storing, by the device, a second plurality of data structures that include second data identifying an aggregation of respective CPU speeds, respective memory sizes, and respective quantities of cores provided in each of the first plurality of data structures,
        wherein the second plurality of data structures define a second level of the hierarchical management system;
    storing, by the device, a third data structure that includes third data identifying an aggregation of respective CPU speeds, respective memory sizes, and respective quantities of cores provided in each of the second plurality of data structures,
        wherein the third data structure defines a third level of the hierarchical management system;
    receiving, by the device and from a first client device, a request to perform an action that requires a threshold CPU speed, a threshold memory size, and a threshold quantity of cores;
    sequentially assessing, by the device and based on the request, a first data structure, of the first plurality of data structures, a second data structure, of the second plurality of data structures, and the third data structure to determine whether the first data structure, the second data structure, or the third data structure is associated with the threshold CPU speed, the threshold memory size, and the threshold quantity of cores;
    assigning, by the device, at least one of the plurality of computing resources to the first client device based on determining that the first data structure, the second data structure, or the third data structure is associated with the threshold CPU speed, the threshold memory size, and the threshold quantity of cores;
    validating a second client device for use as a computing resource based on first client data received from the second client device;
    updating the first plurality of data structures to include data associated with the second client device based on validating the second client device;
    updating the second plurality of data structures based on updating the first plurality of data structures to include the data associated with the second client device; and
    updating the third data structure based on updating the second plurality of data structures.

2. The method of claim 1, wherein sequentially assessing the first data structure, the second data structure, and the third data structure comprises:
    determining whether the first data indicates that the at least one of the plurality of computing resources satisfies the threshold CPU speed, the threshold memory size, and the threshold quantity of cores; and
    wherein assigning the at least one of the plurality of computing resources to the first client device comprises:
        assigning the at least one of the plurality of computing resources to the first client device when the first data indicates that the at least one of the plurality of computing resources satisfies the threshold CPU speed, the threshold memory size, and the threshold quantity of cores.

3. The method of claim 2, wherein sequentially assessing the first data structure, the second data structure, and the third data structure further comprises:
    determining whether the second data indicates that the at least one of the plurality of computing resources satisfies the threshold CPU speed, the threshold memory size, and the threshold quantity of cores when the first data indicates that the at least one of the plurality of computing resources fails to satisfy at least one of the threshold CPU speed, the threshold memory size, or the threshold quantity of cores; and
    wherein assigning the at least one of the plurality of computing resources to the first client device comprises:
        assigning the at least one of the plurality of computing resources to the first client device when the second data indicates that the at least one of the plurality of computing resources satisfies the threshold CPU speed, the threshold memory size, and the threshold quantity of cores.

4. The method of claim 3, wherein sequentially assessing the first data structure, the second data structure, and the third data structure further comprises:
    determining whether the third data indicates that the at least one of the plurality of computing resources satisfies the threshold CPU speed, the threshold memory size, and the threshold quantity of cores when the second data indicates that the at least one of the plurality of computing resources fails to satisfy at least one of the threshold CPU speed, the threshold memory size, or the threshold quantity of cores; and wherein assigning the at least one of the plurality of computing resources to the first client device comprises:
assigning the at least one of the plurality of computing resources to the first client device when the third data indicates that the at least one of the plurality of computing resources satisfies the threshold CPU speed, the threshold memory size, and the threshold quantity of cores.

5. The method of claim 1, wherein one or more of the plurality of computing resources are associated with corresponding data structures of the first plurality of data structures.

6. A device, comprising:
one or more processors configured to:
store, at the device, a first plurality of data structures that include first data identifying a plurality of computing resources provided at an edge of a network for a computing environment, each of the first plurality of data structures identifying, for a respective computing resource of the plurality of computing resources, a respective central process unit (CPU) speed, a respective memory size, and a respective quantity of cores,
wherein the first plurality of data structures define a first level of a hierarchical management system;
store, at the device, a second plurality of data structures that include second data identifying an aggregation of respective CPU speeds, respective memory sizes, and respective quantities of cores provided in each of the first plurality of data structures,
wherein the second plurality of data structures define a second level of the hierarchical management system;
store, at the device, a third data structure that includes third data identifying an aggregation of respective CPU speeds, respective memory sizes, and respective quantities of cores provided in each of the second plurality of data structures,
wherein the third data structure defines a third level of the hierarchical management system;
receive, from a first client device, a request to perform an action that requires a threshold CPU speed, a threshold memory size, and a threshold quantity of cores;
sequentially assess, based on the request, a first data structure, of the first plurality of data structures, a second data structure, of the second plurality of data structures, and the third data structure to determine whether the first data structure, the second data structure, or the third data structure is associated with the threshold CPU speed, the threshold memory size, and the threshold quantity of cores;
assign at least one of the plurality of computing resources to the first client device based on determining that the first data structure, the second data structure, or the third data structure is associated with the threshold CPU speed, the threshold memory size, and the threshold quantity of cores;
validate a second client device for use as a computing resource based on first client data received from the second client device;
update the first plurality of data structures to include data associated with the second client device based on validating the second client device;
update the second plurality of data structures based on updating the first plurality of data structures to include the data associated with the second client device; and
update the third data structure based on updating the second plurality of data structures.

7. The device of claim 6, wherein the first data includes data identifying:
respective addresses of the plurality of computing resources.

8. The device of claim 6, wherein:
the respective CPU speeds provided in each of the first plurality of data structures are associated with respective CPUs of the plurality of computing resources,
the respective memory sizes provided in each of the first plurality of data structures are associated with respective memories of the plurality of computing resources, and
the respective quantities of cores provided in each of the first plurality of data structures are associated with respective processors of the plurality of computing resources.

9. The device of claim 6, wherein each of the first plurality of data structures includes a portion of the first data identifying a corresponding portion of the plurality of computing resources.

10. The device of claim 6, wherein the one or more processors are further configured to:
receive information indicating a resource change associated with the plurality of computing resources;
update one of the first plurality of data structures based on the resource change;
update one of the second plurality of data structures based on updating the one of the first plurality of data structures; and
update the third data structure based on updating the one of the second plurality of data structures.

11. The device of claim 6, wherein the one or more processors are further configured to:
determine resource usage associated with the plurality of computing resources;
generate a report based on the resource usage; and
provide the report for display.

12. A non-transitory computer-readable medium storing instructions, the instructions comprising:
one or more instructions that, when executed by one or more processors, cause the one or more processors to:
store a first plurality of data structures that include first data identifying a plurality of computing resources provided at an edge of a network for a computing environment, each of the first plurality of data structures identifying, for a respective computing resource of the plurality of computing resources, a respective central process unit (CPU) speed, a respective memory size, and a respective quantity of cores,
wherein the first plurality of data structures define a first level of a hierarchical management system;
store a second plurality of data structures that include second data identifying an aggregation of respective CPU speeds, respective memory sizes, and respective quantities of cores provided in each of the first plurality of data structures, wherein the second plurality of data structures define a second level of the hierarchical management system;

store a third data structure that includes third data identifying an aggregation of respective CPU speeds, respective memory sizes, and respective quantities of cores provided in each of the second plurality of data structures, wherein the third data structure defines a third level of the hierarchical management system;

receive, from a first client device, a request to perform an action that requires a threshold CPU speed, a threshold memory size, and a threshold quantity of cores;

sequentially assess, based on the request, a first data structure, of the first plurality of data structures, a second data structure, of the second plurality of data structures, and the third data structure to determine whether the first data structure, the second data structure, or the third data structure is associated with the threshold CPU speed, the threshold memory size, and the threshold quantity of cores;

assign at least one of the plurality of computing resources to the first client device based on determining that the first data structure, the second data structure, or the third data structure is associated with the threshold CPU speed, the threshold memory size, and the threshold quantity of cores;

validate a second client device for use as a computing resource based on first client data received from the second client device;

update the first plurality of data structures to include data associated with the second client device based on validating the second client device;

update the second plurality of data structures based on updating the first plurality of data structures to include the data associated with the second client device; and update the third data structure based on updating the second plurality of data structures.

13. The non-transitory computer-readable medium of claim 12, wherein the one or more instructions, when executed by the one or more processors, further cause the one or more processors to:

enable the second client device to be utilized as at least one computing resource for the computing environment;

calculate a payment for utilization of the second client device as the at least one computing resource for the computing environment; and cause the payment to be provided to the second client device.

14. The non-transitory computer-readable medium of claim 12, wherein the one or more instructions, when executed by the one or more processors, further cause the one or more processors to:

receive information indicating a resource change associated with the plurality of computing resources;

update the first plurality of data structures based on the resource change;

update the second plurality of data structures based on updating the first plurality of data structures; and update the third data structure based on updating the second plurality of data structures.

15. The method of claim 1, further comprising:
providing, to the second client device, a notification indicating that the second client device has been added as a computing resource for the computing environment.

16. The method of claim 15, further comprising:
enabling the second client device to be utilized as at least one computing resource for the computing environment;

calculating compensation for utilization of the second client device as the at least one computing resource for the computing environment; and causing the compensation to be provided to the second client device.

17. The non-transitory computer-readable medium of claim 12, wherein the one or more instructions, that cause the one or more processors to sequentially assess the first data structure, the second data structure, and the third data structure, cause the one or more processors to:

determine whether the first data indicates that the at least one of the plurality of computing resources satisfies the threshold CPU speed, the threshold memory size, and the threshold quantity of cores; and wherein the one or more instructions, that cause the one or more processors to assign the at least one of the plurality of computing resources to the first client device, cause the one or more processors to:

assign the at least one of the plurality of computing resources to the first client device when the first data indicates that the at least one of the plurality of computing resources satisfies the threshold CPU speed, the threshold memory size, and the threshold quantity of cores.

18. The non-transitory computer-readable medium of claim 17, wherein the one or more instructions, that cause the one or more processors to sequentially assess the first data structure, the second data structure, and the third data structure, further cause the one or more processors to:

determine whether the second data indicates that the at least one of the plurality of computing resources satisfies the threshold CPU speed, the threshold memory size, and the threshold quantity of cores when the first data indicates that the at least one of the plurality of computing resources fails to satisfy at least one of the threshold CPU speed, the threshold memory size, or the threshold quantity of cores; and wherein the one or more instructions, that cause the one or more processors to assign the at least one of the plurality of computing resources to the first client device, further cause the one or more processors to:

assign the at least one of the plurality of computing resources to the first client device when the second data indicates that the at least one of the plurality of computing resources satisfies the threshold CPU speed, the threshold memory size, and the threshold quantity of cores.

19. The non-transitory computer-readable medium of claim 12, wherein the action includes one or more of:
performing a service for the first client device;
storing data for the first client device; or
processing data for the first client device.

20. The device of claim 6, wherein the one or more processors are further configured to:
enable the second client device to be utilized as at least one computing resource for the computing environment.

* * * * *